(12) United States Patent
Dudhane et al.

(10) Patent No.: US 12,373,922 B2
(45) Date of Patent: Jul. 29, 2025

(54) SYSTEM AND METHOD FOR BURST IMAGE RESTORATION AND ENHANCEMENT

(71) Applicant: Mohamed bin Zayed University of Artificial Intelligence, Abu Dhabi (AE)

(72) Inventors: Akshay Dudhane, Abu Dhabi (AE); Syed Waqas Zamir, Abu Dhabi (AE); Salman Khan, Abu Dhabi (AE); Fahad Shahbaz Khan, Abu Dhabi (AE)

(73) Assignee: Mohamed bin Zayed University of Artificial Intelligence, Abu Dhabi (AE)

( * ) Notice: Subject to any disclaimer, the term of this patent is extended or adjusted under 35 U.S.C. 154(b) by 549 days.

(21) Appl. No.: 17/969,362

(22) Filed: Oct. 19, 2022

(65) Prior Publication Data

US 2024/0135496 A1    Apr. 25, 2024

Related U.S. Application Data

(60) Provisional application No. 63/414,248, filed on Oct. 7, 2022.

(51) Int. Cl.
*G06T 5/50* (2006.01)
*G06T 3/4076* (2024.01)
*G06T 5/70* (2024.01)

(52) U.S. Cl.
CPC .............. *G06T 5/50* (2013.01); *G06T 3/4076* (2013.01); *G06T 5/70* (2024.01); *G06T 2207/20084* (2013.01); *G06T 2207/20221* (2013.01)

(58) Field of Classification Search
CPC ........... G06T 5/50; G06T 3/4076; G06T 5/70; G06T 2207/20084; G06T 2207/20221; G06T 3/4046; G06T 5/73
See application file for complete search history.

(56) References Cited

U.S. PATENT DOCUMENTS

2019/0124319 A1    4/2019  Barron et al.

OTHER PUBLICATIONS

Rong et.al., "Burst Denoising via Temporally Shifted Wavelet Transforms", pub. 2020, (Year: 2020).*

(Continued)

*Primary Examiner* — Mekonen T Bekele
(74) *Attorney, Agent, or Firm* — Oblon, McClelland, Maier & Neustadt, L.L.P.

(57) ABSTRACT

A mobile device and mobile application, in which the mobile device includes a camera having an image capture circuit operating in a mode to capture a RAW image burst, and processing circuitry, including a neural network engine, to generate a single enhanced image from the RAW image burst. The neural network engine executing program instructions including an edge boosting feature alignment stage to remove inter-frame spatial and color misalignment from the RAW image burst to obtain aligned burst frames, a pseudo-burst feature fusion stage to create a set of pseudo-burst features that combine complementary information from the aligned burst frames, and an adaptive group upsampling stage to progressively increase spatial resolution while merging the set of pseudo-burst features and output the single enhanced image. The mobile application and mobile device perform super-resolution, low-light image enhancement, and burst denoising using a RAW image burst.

20 Claims, 27 Drawing Sheets

(56) References Cited

OTHER PUBLICATIONS

Ahmet Serdar Karadeniz, et al., "Burst Photography for Learning to Enhance Extremely Dark Images", IEEE Transactions on Image Processing, arXiv:2006.09845v2 [cs.CV], Nov. 19, 2021, pp. 1-14.

Ziwei Luo, et al., "EBSR: Feature Enhanced Burst Super-Resolution with Deformable Alignment", Proceedings of the IEEE/CVF Conference on Computer Vision and Pattern Recognition (CVPR) Workshops, Jun. 19-25, 2021, pp. 471-478.

Miika Aittala, et al., "Burst Image Deblurring Using Permutation Invariant Convolutional Neural Networks", Proceedings of the European Conference on Computer Vision (ECCV), 2018, pp. 731-747.

* cited by examiner

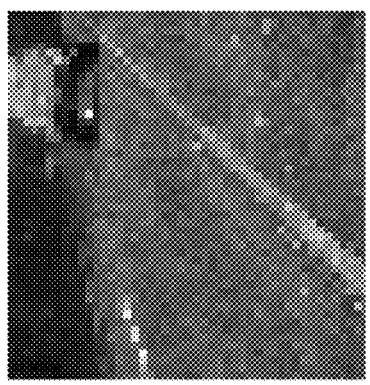
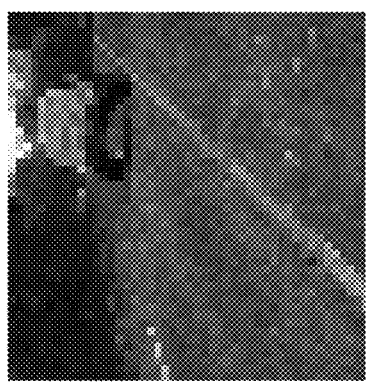
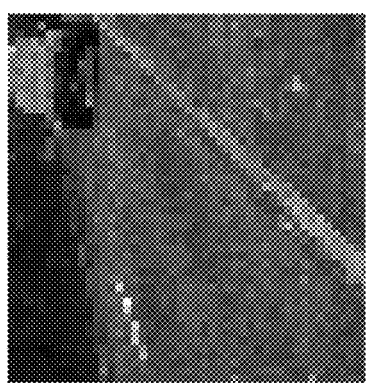
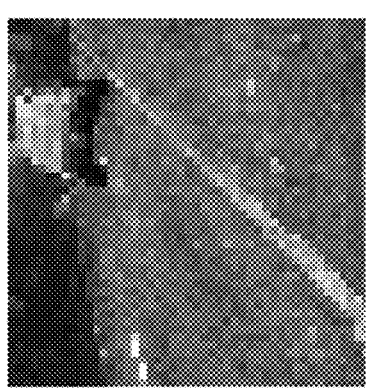
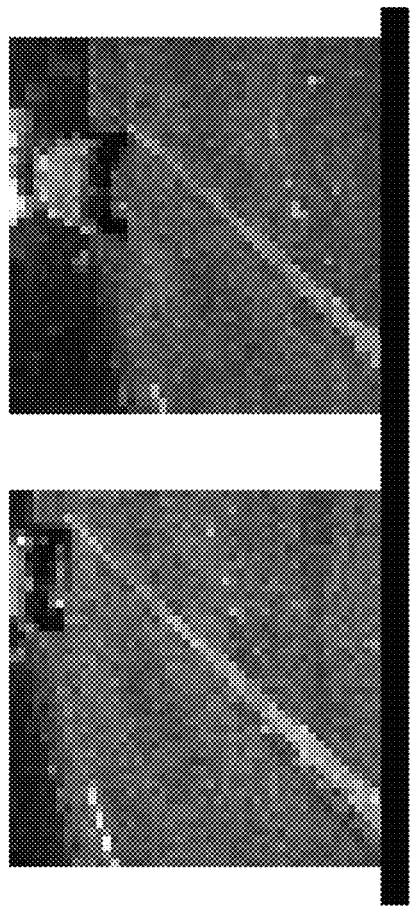
FIG. 4B

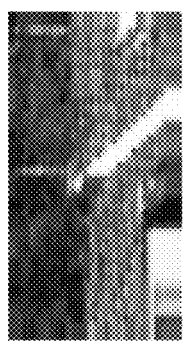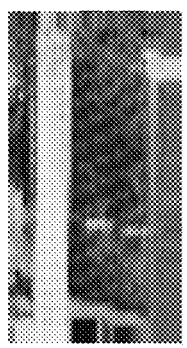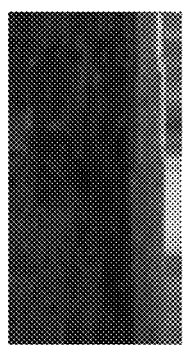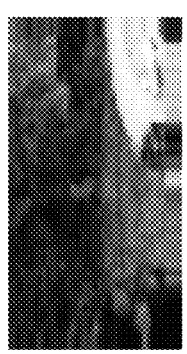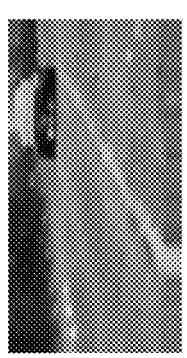
FIG. 17A
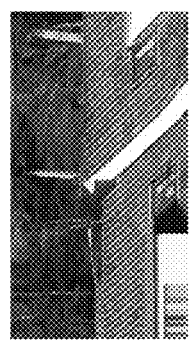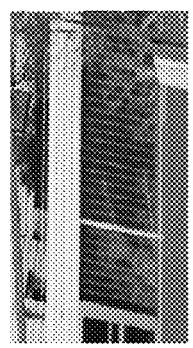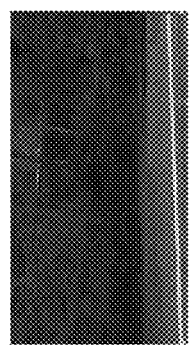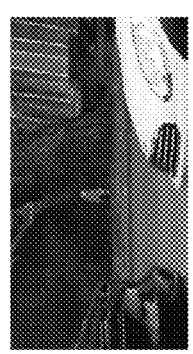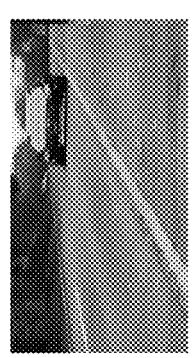
FIG. 17B
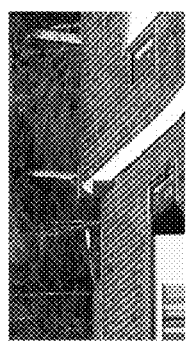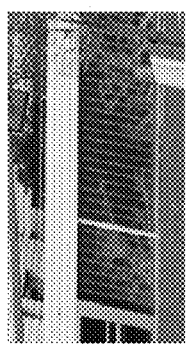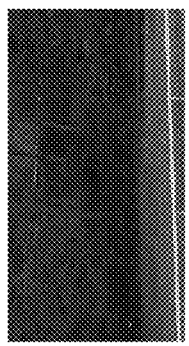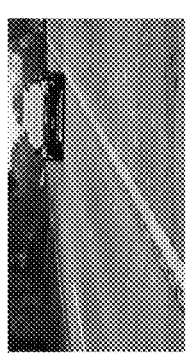
FIG. 17C

SYSTEM AND METHOD FOR BURST IMAGE RESTORATION AND ENHANCEMENT

CROSS-REFERENCE TO RELATED APPLICATIONS

This application claims the benefit of priority to provisional application No. 63/414,248 filed Oct. 7, 2022, the entire contents of which are incorporated herein by reference.

STATEMENT REGARDING PRIOR DISCLOSURE BY THE INVENTORS

Aspects of this technology are described in Dudhane, Akshay, et al. "Burst image restoration and enhancement." *Proceedings of the IEEE/CVF Conference on Computer Vision and Pattern Recognition.* 2022, and is incorporated herein by reference in its entirety.

BACKGROUND

Technical Field

The present disclosure is directed to burst image restoration and enhancement, particularly in the case of mobile device photography.

Description of the Related Art

High-end digital cameras, such as digital single-lens reflex (DSLR) cameras and medium format digital cameras, can capture images of excellent quality with vivid details. As an alternative to DSLR cameras, camera manufacturers are developing mirrorless interchangeable-lens cameras (MILC) (also referred to as digital single-lens mirrorless (DSLM) camera). The DSLR, MILC and medium format digital cameras achieve their high image quality and detail by way of interchangeable lenses and image sensors of various sizes and resolution. Other factors can contribute to image quality, such as pixel quality and noise. In addition, the quality of an image also depends on characteristics of the display or print that is viewed by the user, such as contrast, vibrance, saturation, and sharpness.

In general, the larger the image sensor size, the more light that can be gathered for a set shutter speed, ISO (exposure sensitivity), and aperture. When the camera shutter is opened, it exposes the image sensor. A bigger sensor size can gather more light on its surface for the image. The light determines the quality of the image in terms of exposure balance and dynamic range.

In the absence of large sensor size, longer exposure can take in more light in smaller sensors. However, while small sensor drawbacks can be offset using a longer exposure to take in more light, long exposure makes pictures more susceptible to blur from handshake and scene movement. Blur reduces image sharpness regardless of the sensor's resolution. In a similar manner, wider aperture lenses can take in more light. Still, wider aperture lenses are harder to build without introducing lens distortion artifacts, as well as altering the field of view. Furthermore, larger sensors are better for low-light photography.

Image sensors used in digital cameras come in a range of sizes. The very largest are used in medium format cameras, typically via a digital back which can be used as an alternative to a film back. A full-frame size is the same size as 35 mm film (image format 24×36 mm). Most modern digital cameras use a smaller (i.e., cropped) sensor that is APS-C sized, which is approximately 22×15 mm, slightly smaller than the size of an APS-C film frame, or about 40% of the area of a full-frame sensor. Other cropped sensor sizes found in digital cameras include the Four Thirds System sensor at 26% of full frame, APS-H sensors at around 61% of full frame, and the original Foveon X3 sensor at 33% of full frame. On the other end, Leica offers an S-System DSLR with a large 30×45 mm array containing 37 million pixels. This sensor is about 50% larger than a full-frame sensor.

An increasingly popular use of smartphones is for taking pictures and videos. Smartphones are being configured with one or more built-in cameras and powerful computing resources, for among other things, performing image processing functions in order to support the built-in camera(s). Smartphones are generally not large enough to fit a full-frame camera sensor into the body. Current smartphone image sensor sizes are less than about 16 mm (Sharp Aquos R6), which is far smaller than full-frame and cropped sensors used with standard digital cameras. The measurement is based on the diagonal length of the sensor, which is the square root of the squares of the length l and width w. The smaller image sensors fit well inside smartphones, which helps keep the form factor smaller and lighter for consumers.

Since smartphones are generally equipped with smaller image sensors than DSLR cameras, computational photography is a possible solution to increase image quality to DSLR quality. Thus, one goal of computational photography is to generate high quality images with the smartphone cameras. See Andrey Ignatov, Nikolay Kobyshev, Radu Timofte, Kenneth Vanhoey, and Luc Van Gool. Dslr-quality photos on mobile devices with deep convolutional networks. In *ICCV,* 2017, incorporated herein by reference in its entirety. However, the physical constraints of smartphone cameras pose limitations on the extent that quality of the image can be reconstructed. For instance, a small image sensor size poses limits on spatial resolution and small lens size and small aperture result in noisy and color distorted images in low-light conditions. See Mauricio Delbracio, Damien Kelly, Michael S Brown, and Peyman Milanfar. Mobile computational photography: A tour. arXiv: 2102.09000, 2021, incorporated herein by reference in its entirety. Similarly, small pixel cavities accumulate less light therefore yielding low-dynamic range.

To alleviate issues including small image sensor size and small lens and aperture, burst (multi-frame) photography has been considered as one solution instead of single-frame processing. See Samuel W Hasinoff, Dillon Sharlet, Ryan Geiss, Andrew Adams, Jonathan T Barron, Florian Kainz, Jiawen Chen, and Marc Levoy. Burst photography for high dynamic range and low-light imaging on mobile cameras. *TOG,* 2016, incorporated herein by reference in its entirety.

Typically, burst mode in smartphones is used during an event in which the object is moving, or the background is changing, or the scene is brief. Smartphone users may also use the burst shot photos to make animations or even videos, which may look better than the recorded video for the same event. When editing burst shot photos, a user can edit each photo individually, and export some selected photos from the group/set.

However, creation of a single high-quality image from a burst image presents its own challenges. Image quality in a burst image is effected by factors such as human handling during burst image acquisition, or unusual circumstances in the scene. For example, during image burst capturing, any movement in camera and/or scene objects will cause misalignment issues between burst images. This misalignment between images results in ghosting and blurring artifacts when a single output image is created from the burst images. See Bartlomiej Wronski, Ignacio Garcia-Dorado, Manfred Ernst, Damien Kelly, Michael Krainin, Chia-Kai Liang, Marc Levoy, and Peyman Milanfar. Handheld multi-frame super-resolution. *TOG*, 2019, incorporated herein by reference in its entirety. Therefore, there remains a need to develop a multi-frame processing algorithm and corresponding system that are robust to problems that can occur due to inconsistencies related to burst image acquisition and that require no special conditions when performing burst acquisition.

Some existing burst processing techniques separately extract and align features of burst images and typically employ late feature fusion mechanisms. However, the separate extraction and alignment of features is still insufficient. See Goutam Bhat, Martin Danelljan, Luc Van Gool, and Radu Timofte. Deep burst super-resolution. In *CVPR*, 2021; and Goutam Bhat, Martin Danelljan, Fisher Yu, Luc Van Gool, and Radu Timofte. Deep reparametrization of multi-frame super-resolution and denoising. In *ICCV*, 2021, each incorporated herein by reference in their entirety.

Somewhat related to burst image processing are techniques used for single image super-resolution, multi-frame super-resolution, low-light image enhancement, and multi-frame misalignment.

Single Image Super-resolution (SISR). Since the first CNN-based work, data-driven approaches have achieved high performance gains over conventional counterparts. See Chao Dong, Chen Change Loy, Kaiming He, and Xiaoou Tang. Learning a deep convolutional network for image super-resolution. In *ECCV*, 2014; William T Freeman, Thouis R Jones, and Egon C Pasztor. Example-based super-resolution. *CG&A*, 2002; and Jianchao Yang, John Wright, Thomas S Huang, and Yi Ma. Image super-resolution via sparse representation. *TIP*, 2010, each incorporated herein by reference in their entirety. The success of CNNs is mainly attributed to their architecture design. See Saeed Anwar, Salman Khan, and Nick Barnes. A deep journey into super-resolution: A survey. *ACM Computing Surveys (CSUR)*, 2020; and Syed Waqas Zamir, Aditya Arora, Salman Khan, Munawar Hayat, Fahad Shahbaz Khan, Ming-Hsuan Yang, and Ling Shao. Multi-stage progressive image restoration. In *CVPR*, 2021, each incorporated herein by reference in their entirety. Given a low-resolution image (LR), early methods learn to directly generate latent super resolution (SR) image. See Dong et al. (2014); and Chao Dong, Chen Change Loy, Kaiming He, and Xiaoou Tang. Image super-resolution using deep convolutional networks. *TPAMI*, 2015, each incorporated herein by reference in their entirety. In contrast, recent approaches learn to produce high frequency residual to which a low resolution (LR) image is added to generate the final SR output. See Zheng Hui, Xiumei Wang, and Xinbo Gao. Fast and accurate single image super-resolution via information distillation network. In *CVPR*, 2018; and Ying Tai, Jian Yang, and Xiaoming Liu. Image super-resolution via deep recursive residual network. In *CVPR*, 2017, each incorporated herein by reference in their entirety. Other notable SISR network designs employ recursive learning, progressive reconstruction, attention mechanisms, and generative adversarial networks. See Namhyuk Ahn, Byungkon Kang, and Kyung-Ah Sohn. Fast, accurate, and lightweight super-resolution with cascading residual network. In *ECCV*, 2018; Jiwon Kim, Jung Kwon Lee, and Kyoung Mu Lee. Deeply-recursive convolutional network for image super-resolution. In *CVPR*, 2016; Wei-Sheng Lai, Jia-Bin Huang, Narendra Ahuja, and Ming-Hsuan Yang. Deep laplacian pyramid networks for fast and accurate superresolution. In *CVPR*, 2017; Zhaowen Wang, Ding Liu, Jianchao Yang, Wei Han, and Thomas Huang. Deep networks for image super-resolution with sparse prior. In *ICCV*, 2015; Tao Dai, Jianrui Cai, Yongbing Zhang, Shu-Tao Xia, and Lei Zhang. Second-order attention network for single image super-resolution. In *CVPR*, 2019; Syed Waqas Zamir, Aditya Arora, Salman Khan, Munawar Hayat, Fahad Shahbaz Khan, Ming-Hsuan Yang, and Ling Shao. Learning enriched features for real image restoration and enhancement. In *ECCV*, 2020; Yulun Zhang, Kunpeng Li, Kai Li, Lichen Wang, Bineng Zhong, and Yun Fu. Image super-resolution using very deep residual channel attention networks. In *ECCV*, 2018; Yulun Zhang, Yapeng Tian, Yu Kong, Bineng Zhong, and Yun Fu. Residual dense network for image restoration. *TPAMI*, 2020; Christian Ledig, Lucas Theis, Ferenc Huszár, Jose Caballero, Andrew Cunningham, Alejandro Acosta, Andrew Aitken, Alykhan Tejani, Johannes Totz, Zehan Wang, et al. Photo-realistic single image super-resolution using a generative adversarial network. In *CVPR*, 2017; Mehdi S M Sajjadi, Bernhard Scholkopf, and Michael Hirsch. Enhancenet: Single image super-resolution through automated texture synthesis. In *ICCV*, 2017; and Xintao Wang, Ke Yu, Shixiang Wu, Jinjin Gu, Yihao Liu, Chao Dong, Yu Qiao, and Chen Change Loy. Esrgan: Enhanced super-resolution generative adversarial networks. In *ECCVW*, 2018, each incorporated herein by reference in their entirety.

Multi-Frame Super-Resolution (MFSR). Tsai et al. are the first to deal with the MFSR problem. See Roger Y. Tsai and Thomas S. Huang. Multiframe image restoration and registration. *Advance Computer Visual and Image Processing*, 1984, incorporated herein by reference in its entirety. They propose a frequency domain based method that performs registration and fusion of the multiple aliased LR images to generate a SR image. Since processing multi-frames in the frequency domain leads to visual artifacts, several other works aim to improve results by incorporating image priors in high resolution (HR) reconstruction process, and making algorithmic choices such as iterative back-projection. See Tsai et al.; Henry Stark and Peyma Oskoui. High-resolution image recovery from image-plane arrays, using convex projections. *JOSA A*, 1989; Michal Irani and Shmuel Peleg. Improving resolution by image registration. *CVGIP*, 1991; and Shmuel Peleg, Danny Keren, and Limor Schweitzer. Improving image resolution using subpixel motion. *PRL*, 1987, each incorporated herein by reference in their entirety. Farsui et al. design a joint multi-frame demosaicking and SR approach that is robust to noise. See Sina Farsiu, Michael Elad, and Peyman Milanfar. Multiframe demosaicing and super-resolution from undersampled color images. In *Computational Imaging II*, 2004, incorporated herein by reference in its entirety. MFSR methods have also been developed for specific applications, such as for handheld devices, to increase spatial resolution of face images, and in satellite imagery. See Wronski et al.; Evgeniya Ustinova and Victor Lempitsky. Deep multi-frame face super-resolution. arXiv: 1709.03196, 2017; Michel Deudon, Alfredo Kalaitzis, Israel Goytom, Md Rifat Arefin, Zhichao Lin, Kris Sankaran, Vincent Michalski, Samira E Kahou, Julien Cornebise, and Yoshua Bengio. HighRes-net: recursive fusion for multi-frame super-resolution of satellite imagery. arXiv: 2002.06460, 2020; and Andrea Bordone Molini, Diego Valsesia, Giulia Fracastoro, and Enrico Magli. Deepsum: Deep neural network for super-resolution of unregistered multitemporal images. *TGRS,* 2019, each incorporated herein by reference in their entirety. Lecouat et al. retains the interpretability of conventional approaches for inverse problems by introducing a deep-learning based optimization process that alternates between motion and HR image estimation steps. See Bruno Lecouat, Jean Ponce, and Julien Mairal. Lucas-kanade reloaded: End-to-end super-resolution from raw image bursts. In *ICCV,* 2021, incorporated herein by reference in its entirety. Recently, Bhat et al. proposed a multi-frame burst SR method that first aligns burst image features using an explicit PWCNet and then perform feature integration using an attention-based fusion mechanism. See Bhat et al.; Deqing Sun, Xiaodong Yang, Ming-Yu Liu, and Jan Kautz. Pwc-net: Cnns for optical flow using pyramid, warping, and cost volume. In *CVPR,* 2018, each incorporated herein by reference in their entirety. However, explicit use of motion estimation and image warping techniques can be challenging especially when handling scenes with fast object motions. Recent works show that the deformable convolution can effectively handle inter-frame alignment issues due to being implicit and adaptive in nature. See Yapeng Tian, Yulun Zhang, Yun Fu, and Chenliang Xu. Tdan: Temporally-deformable alignment network for video super-resolution. In *CVPR,* 2020; Xintao Wang, Kelvin C K Chan, Ke Yu, Chao Dong, and Chen Change Loy. Edvr: Video restoration with enhanced deformable convolutional networks. In *CVPRW,* 2019; and Zhu et al., each incorporated herein by reference in their entirety.

Low-Light Image Enhancement. Images captured in low light conditions are usually dark, noisy and color distorted. These problems have been somewhat alleviated by using long sensor exposure time, wide aperture, camera flash, and exposure bracketing. See Delbracio et al.; and Syed Waqas Zamir, Aditya Arora, Salman Khan, Fahad Shahbaz Khan, and Ling Shao. Learning digital camera pipeline for extreme low-light imaging. *Neurocomputing,* 2021, each incorporated herein by reference in their entirety. However, each of these solutions come with their own weaknesses. For example, long exposure yields images with ghosting artifacts due to camera or object movements. Wide apertures are not available on smartphone devices. See-in-the-Dark method is an early attempt to replace the standard camera imaging pipeline with a CNN model. See Chen Chen, Qifeng Chen, Jia Xu, and Vladlen Koltun. Learning to see in the dark. In *CVPR,* 2018, incorporated herein by reference in its entirety. The method takes as input a RAW input image captured in extreme low-light and learns to generate a well-lit sRGB image. Later this work has been improved with a new CNN-based architecture and by employing a combined pixel-wise and perceptual loss. See Paras Maharjan, Li Li, Zhu Li, Ning Xu, Chongyang Ma, and Yue Li. Improving extreme low-light image denoising via residual learning. In *ICME,* 2019; and Zamir et al, each incorporated herein by reference in their entirety. Zaho et al. takes the advantage of burst imaging and propose a recurrent convolutional network that can produce noise-free bright sRGB image from a burst of RAW images. See Di Zhao, Lan Ma, Songnan Li, and Dahai Yu. End-to-end denoising of dark burst images using recurrent fully convolutional networks. arXiv: 1904.07483, 2019, incorporated herein by reference in its entirety. The results have been further improved by Karadeniz et al. with their two-stage approach: a first sub-network performs denoising, and a second sub-network provides a visually enhanced image. See Ahmet Serdar Karadeniz, Erkut Erdem, and Aykut Erdem. Burst photography for learning to enhance extremely dark images. arXiv: 2006.09845, 2020, incorporated herein by reference in its entirety. Although these approaches demonstrate significant progress in enhancing low-light images, they do not address inter-frame misalignment and information interaction.

Multi-Frame Denoising. Early works extended the image denoising algorithm BM3D to video. See Kostadin Dabov, A. Foi, and K. Egiazarian. Video denoising by sparse 3d transform-domain collaborative filtering. 2007 15*th European Signal Processing Conference,* pages 145-149, 2007; M. Maggioni, G. Boracchi, A. Foi, and K. Egiazarian. Video denoising using separable 4d nonlocal spatiotemporal transforms. In *Electronic Imaging,* 2011; M. Maggioni, G. Boracchi, A. Foi, and K. Egiazarian. Video denoising, deblocking, and enhancement through separable 4-d nonlocal spatiotemporal transforms. *TIP,* 2012; and Kostadin Dabov, A. Foi, V. Katkovnik, and K. Egiazarian. Image denoising by sparse 3-d transform-domain collaborative filtering. *TIP,* 2007, each incorporated herein by reference in their entirety. Buades et al. perform denoising by estimating the noise level from the aligned images followed by the combination of pixel-wise mean and BM3D. See A. Buades, B. Coll, and J. Morel. A non-local algorithm for image denoising. In *CVPR,* 2005, incorporated herein by reference in its entirety. A hybrid 2D/3D Wiener filter is used in Hasinoff et al. to denoise and merge burst images for high dynamic range and low-light photography tasks. See S. W. Hasinoff, Dillon Sharlet, Ryan Geiss, Andrew Adams, J. Barron, F. Kainz, Jiawen Chen, and M. Levoy. Burst photography for high dynamic range and low-light imaging on mobile cameras. *TOG,* 2016, incorporated herein by reference in its entirety. Godard et al. utilize recurrent neural network (RNN) and extend a single image denoising network for multiple frames. See C. Godard, K. Matzen, and Matthew Uyttendaele. Deep burst denoising. In *ECCV,* 2018, incorporated herein by reference in its entirety. Mildenhall et al. generate per-pixel kernels through the kernel prediction network (KPN) to merge the input images. See Ben Mildenhall, J. Barron, Jiawen Chen, Dillon Sharlet, R. Ng, and Robert Carroll. Burst denoising with kernel prediction networks. In *CVPR,* 2018, incorporated herein by reference in its entirety. In Marinc et al., authors extend KPN approach to predict multiple kernels, while Xia et al. introduce basis prediction networks (BPN) to enable the use of larger kernels. See Talmaj Marinc, V. Srinivasan, S. G¨ul, C. Hellge, and W. Samek. Multi-kernel prediction networks for denoising of burst images. In *ICIP,* 2019; and Zhihao Xia, Federico Perazzi, M. Gharbi, Kalyan Sunkavalli, and A. Chakrabarti. Basis prediction networks for effective burst denoising with large kernels. In *CVPR,* 2020, each incorporated herein by reference in their entirety. Recently, Bhat et al. propose a deep reparameterization of the maximum a posteriori formulation for the multi-frame SR and denoising. See Bhat et al., *ICCV,* 2021.

Accordingly it is one object of the present disclosure to provide a mobile device with a feature of obtaining a high-quality RGB image by capturing and processing a RAW image burst. A further object is to provide the mobile device with burst image processing that performs information exchange between burst frames, so that degradations due to acquisition of a burst image sequence are filtered out while the actual scene details are preserved and enhanced. The burst image processing in the mobile device delivers exceptional performance on burst super-resolution, burst low-light image enhancement and burst denoising tasks.

SUMMARY

An aspect is a mobile device that can include a camera having an image capture circuit operating in a mode to capture a RAW image burst containing ten or more RGB images, and processing circuitry, including a neural network engine, to generate a single enhanced image from the RAW image burst. The neural network engine executing program instructions including an edge boosting feature alignment stage to remove inter-frame spatial and color misalignment from the RAW image burst to obtain a plurality of aligned burst frames a pseudo-burst feature fusion stage to create a set of pseudo-burst features that combine complementary information from the aligned burst frames, and an adaptive group upsampling stage to progressively increase spatial resolution while merging the set of pseudo-burst features and output the single enhanced image.

A further aspect is a mobile application, which when downloaded and executed in a neural network engine, performs a method that can include removing inter-frame spatial and color misalignment from a RAW image burst to obtain a plurality of aligned burst frames, creating a set of pseudo-burst features that combine complementary information from the aligned burst frames, and progressively increasing spatial resolution while merging the set of pseudo-burst features and outputting a single enhanced image.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 4A, 4B is an exemplary raw image burst illustrating misalignment between multiple frames;

FIG. 17A, 17B, 17C are images illustrating results for ×8 burst SR on SyntheticBurst dataset;

DETAILED DESCRIPTION

Figure 1:
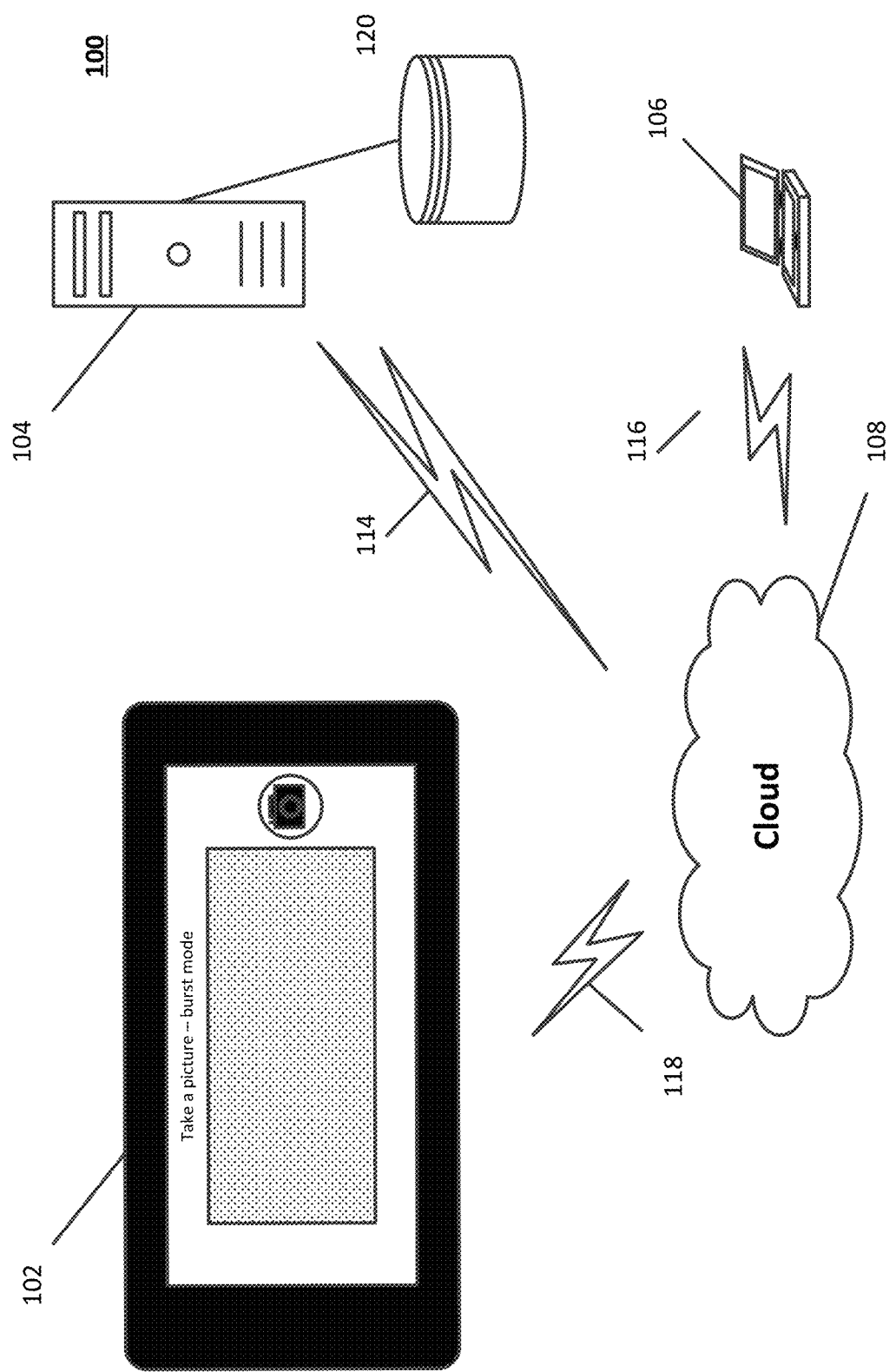
FIG. 1 illustrates a development and inference system for burst image processing in accordance with an exemplary aspect of the disclosure.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Current handheld devices can acquire burst image sequence in a quick succession. In the case of mobile devices that use the Android operating system, burst images can be captured by pressing and sliding down on the image capture button. For example, Galaxy S20 burst mode can take up to 100 photos in one shot. The user can release their finger from the screen anytime to stop burst mode and take fewer than 100 photos. In the case of iPhone, a burst mode can be selected and used to take burst photos with the rear or front-facing cameras. In the case of an Android mobile device, a photo can be selected as a favorite photo. Individual photos can be edited and exported. Individual photos will not be linked to the burst shot once exported. The iPhone is currently configured with an integrated processor as a system on chip (SoC). The SoC includes an image processor that can perform computational photography functions. In addition, the SoC includes a GPU and a Neural Engine (Apple Neural Engine) that can be used for performing inference using a machine learning model, for example, a transformer model.

However, the conventional smartphone camera is no match for a DSLR camera, due in part to a smaller image sensor and lack of choice of lenses. The image processor of the SoC can perform computational photography functions but is limited by the constraints of the smartphone camera, including smaller image sensor and limited lens size. Capturing burst images with a conventional smartphone camera may be suitable when used for selection of individual photos. A burst image sequence may be used as a short video. However, the individual frames suffer from multiple degradations and are typically misaligned due to camera shake and object motions.

One object of the presently disclosed Burst Image Restoration is to provide a device, system and method for effectively combining complimentary cues across multiple burst frames to generate high-quality outputs. In one aspect the disclosed burst image processing focuses on an effective information exchange between burst frames, such that degradations get filtered out while the actual scene details are preserved and even enhanced. The approach creates a set of pseudo-burst features that combine complimentary information from all the input burst frames to seamlessly exchange information. As disclosed herein, a pseudo-burst cannot be successfully created unless individual burst frames are properly aligned to discount inter-frame movements. Therefore, the present device, system and method initially extracts pre-processed features from each burst frame and matches them using an edge-boosting burst alignment module. The pseudo-burst features are then created and enriched using multi-scale contextual information. A further step is to adaptively aggregate information from the pseudo-burst features to progressively increase resolution in multiple stages while merging the pseudo-burst features. In comparison to existing methods and system that typically follow a late fusion scheme with single-stage upsampling, the present device, system and method performs favorably, delivering state-of-the-art performance on burst super-resolution, burst low-light image enhancement and burst denoising tasks.

Before synthesizing pseudo-bursts, the present device, system and method preferably first aligns the input burst frames (having arbitrary displacements) so that the relevant pixel-level cues are aggregated in the later stages. This contrasts with conventional systems which use explicit motion estimation techniques (e.g., optical flow) to align input frames which are typically bulky pretrained modules that cannot be fully integrated within an end-to-end learnable pipeline. See Bhat et al., *CVPR*, 2021 and Bhat at al., *ICCV*, 2021. This can result in errors caused during the flow estimation stage to be propagated to the warping and image processing stages, thereby negatively affecting the generated outputs.

Embodiments implicitly learn the frame alignment with deformable convolutions. Deformable convolutions have been introduced as convolutions that can effectively adapt to the given problem. See Xizhou Zhu, Han Hu, Stephen Lin, and Jifeng Dai. Deformable convnets v2: More deformable, better results. In *CVPR*, 2019, incorporated herein by reference in its entirety. Further, embodiments integrate the edge boosting refinement via a back-projection operation. A deep back-projection network has been proposed for improving super-resolution. The deep back-projection operation provides an error feedback mechanism for projection errors at each stage of up- and down-sampling stages, each of which represents different types of image degradation and high-resolution components. See Muhammad Haris, Gregory Shakhnarovich, and Norimichi Ukita. Deep back-projection networks for super-resolution. In *CVPR*, 2018, incorporated herein by reference in its entirety. Embodiments facilitate sustaining the alignment accuracy in cases where highly complex motions between burst images exist and where using only the deformable convolutional may not be sufficient for reliable alignment.

Noise is always present in images irrespective of the lighting condition in which they are acquired. An example denoising network is trained with realistic synthetic data, where realistic synthetic data is obtained using a framework that models the camera imaging pipeline. See Syed Waqas Zamir, Aditya Arora, Salman Khan, Munawar Hayat, Fahad Shahbaz Khan, Ming-Hsuan Yang, and Ling Shao. CycleISP: real image restoration via improved data synthesis. In *CVPR*, 2020, incorporated herein by reference in its entirety. On the other hand, the disclosed burst image processing network removes noise early in the network to reduce difficulty in the alignment and fusion stages. Furthermore, embodiments of the burst image processing network incorporate residual global context attention in a neural network architecture for feature extraction and refinement/denoising.

While the application of neural network architectures can be generalized to any burst processing task, the effectiveness can be judged based on burst super-resolution, burst low-light image enhancement and burst denoising. In super-resolution (SR), upsampling is the key step for image reconstruction. Existing burst SR methods first fuse the multi-frame features, and then use pixel-shuffle operation to obtain the high-resolution image. See Bhat et al., *CVPR*, 2021; Bhat at al., *ICCV*, 2021; [Yes, page 4] and Wenzhe Shi, Jose Caballero, Ferenc Huszár, Johannes Totz, Andrew P Aitken, Rob Bishop, Daniel Rueckert, and Zehan Wang. Real-time single image and video super-resolution using an efficient sub-pixel convolutional neural network. *CVPR*, 2016, each incorporated herein by reference in its entirety. However, some embodiments can leverage the information available in multiple frames to perform merging and upsampling in a flexible and effective manner. As such, embodiments include adaptive group upsampling in the neural network that progressively increases the resolution while merging complimentary features.

The inventors have found that the SISR approaches cannot handle multi-degraded frames from an input burst. Embodiments of the burst image processing network perform multi-frame SR by effectively merging cross-frame information towards a HR output.

The inventors have found that unlike existing MFSR methods, the present device, system and method implicitly learn the inter-frame alignment and then channel-wise aggregate information followed by adaptive upsampling to effectively utilize multi-frame information.

Aspects of the present device, system and method include: an edge boosting alignment technique that removes spatial and color misalignment issues among the burst features; a pseudo-burst feature fusion mechanism to enable inter-frame communication and feature consolidation; and an adaptive group upsampling module for progressive fusion and upscaling.

Smartphones, tablet computers, laptop computers, and other personal computers are conventionally configured with specialized processors for accelerating neural network operations. In addition, cloud services include scalable environments for neural network model development. FIG. 1 illustrates a development and inference system of the present disclosure for burst image processing. A neural network model for burst image processing may be developed and trained in a cloud service 108 or in a personal computer 106 that is sufficiently configured for performing machine learning operations needed to train the neural network model. Data sets for training a neural network model may be obtained through a server 104 that stores a data set in a database 120. A trained neural network model can be incorporated into a mobile device 102 having a camera function, such as a smartphone and a tablet computer. The cloud service 108 and server computer 104 may be accessed through a wireless connection 114, 116, 118, a wired connection, or a combination of wireless connection and wired connection.

As an example, Apple provides a workflow which includes training machine learning (ML) models using accelerated training on GPUs with PyTorch and TensorFlow by leveraging the Metal Performance Shaders (MPS) back end. For deployment of trained models on Apple devices, Apple provides coremltools, which is an open-source unified conversion tool, to convert their favorite PyTorch and TensorFlow models to the Core ML model package format. Core ML can then be used to seamlessly blend processors, such as CPU, GPU, and Apple Neural Engine (ANE) to create a hybrid execution on a given device.

In a comparable manner, Qualcomm's current Snapdragon™ mobile platform includes a Snapdragon Neural Processing Engine, which can run training and inferencing on Snapdragon processors including Snapdragon™ CPU, Adreno™ GPU, and Hexagon™ DSP.

Figure 2:
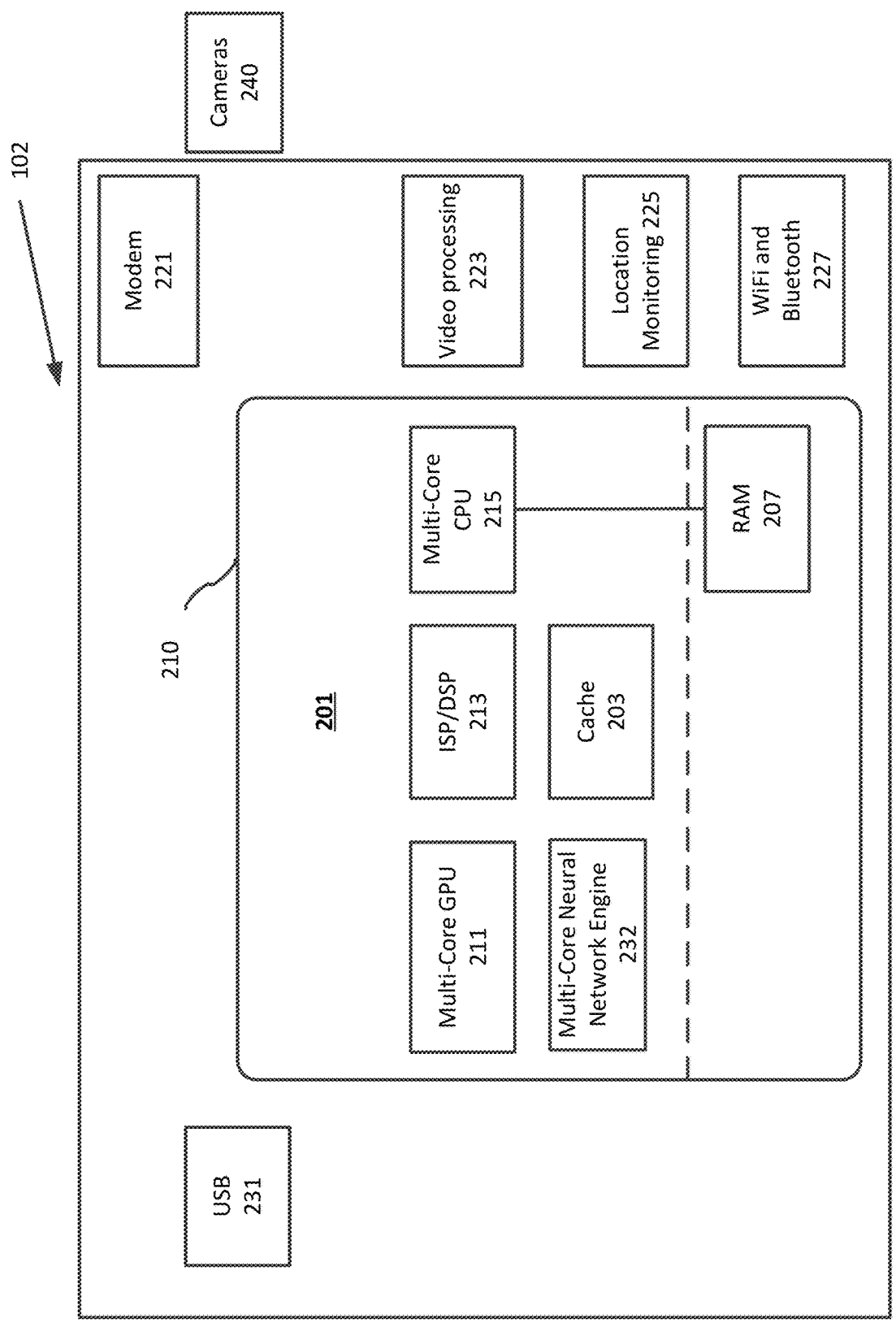
FIG. 2 is a block diagram of a smartphone device in accordance with an exemplary aspect of the disclosure.

FIG. 2 is a block diagram of a smartphone device. Currently, smartphone devices, as well as tablet devices, such as Apple iPhone and iPad devices, and Android operating system-based devices, use a system on a chip (SoC) that includes a multi-core CPU, a multi-core GPU, and circuitry for specialized machine learning, such as a neural network engine (which in the case of Apple, is referred to as Apple Neural Engine ANE). In addition, in order to handle camera images and video, these devices typically include an image processor (ISP). An example of Android operating system-based devices are those that include a Qualcomm Snapdragon™ processor. Qualcomm's Snapdragon™ mobile platform is a system on a chip (SoC) that includes a CPU, GPU, and DSP.

A smartphone device 102 includes one or more cameras 240. The cameras 240 include an image sensor and an associated lens. In order to keep the profile of a smartphone device relatively flat, a typical lens is limited in height, for example to around 26 mm. Also, the image sensor is optimized for the maximum area that the smartphone can handle, but still preserve space for other components. Thus, a smartphone device 102, or tablet computer, seeks to include the largest image sensor and lens that can fit within the limited form factor of a hand-held device.

The processing system 201 provides support for simultaneous camera sensor inputs, video decoding and playback, location services, wireless communications, and cellular services. The processing system 201 includes a central processing unit (CPU) 215, and may include a graphics processing unit (GPU) 211 and an image signal processor (DSP) 213 or a digital signal processor (DSP) 213. The CPU 215 may work with a memory, which may be any of several types of volatile memory 207, including RAM, SDRAM, DDR SDRAM, to name a few. The DSP 213 may include one or more dedicated caches 203 in order to perform computer vision functions as well as machine learning functions. The GPU 211 performs graphics processing for a high resolution display device. The GPU 211, ISP/DSP 213, CPU 215, Cache 203, and in some embodiments, a cellular modem 221, may all be contained in a single system-on-chip (SOC) 210. The processing system 201 may also include video processing circuitry 223 for video decoding and playback, location service circuitry 225, including GPS and dead reckoning, and connectivity service circuitry 227, including WiFi and Bluetooth. The processing system 201 may include one or more input/output ports, including USB connector(s) 231, such as connectors for USB 2, USB 3, etc. In some embodiments, the SOC may include a specialized neural network engine 232.

Figure 3:
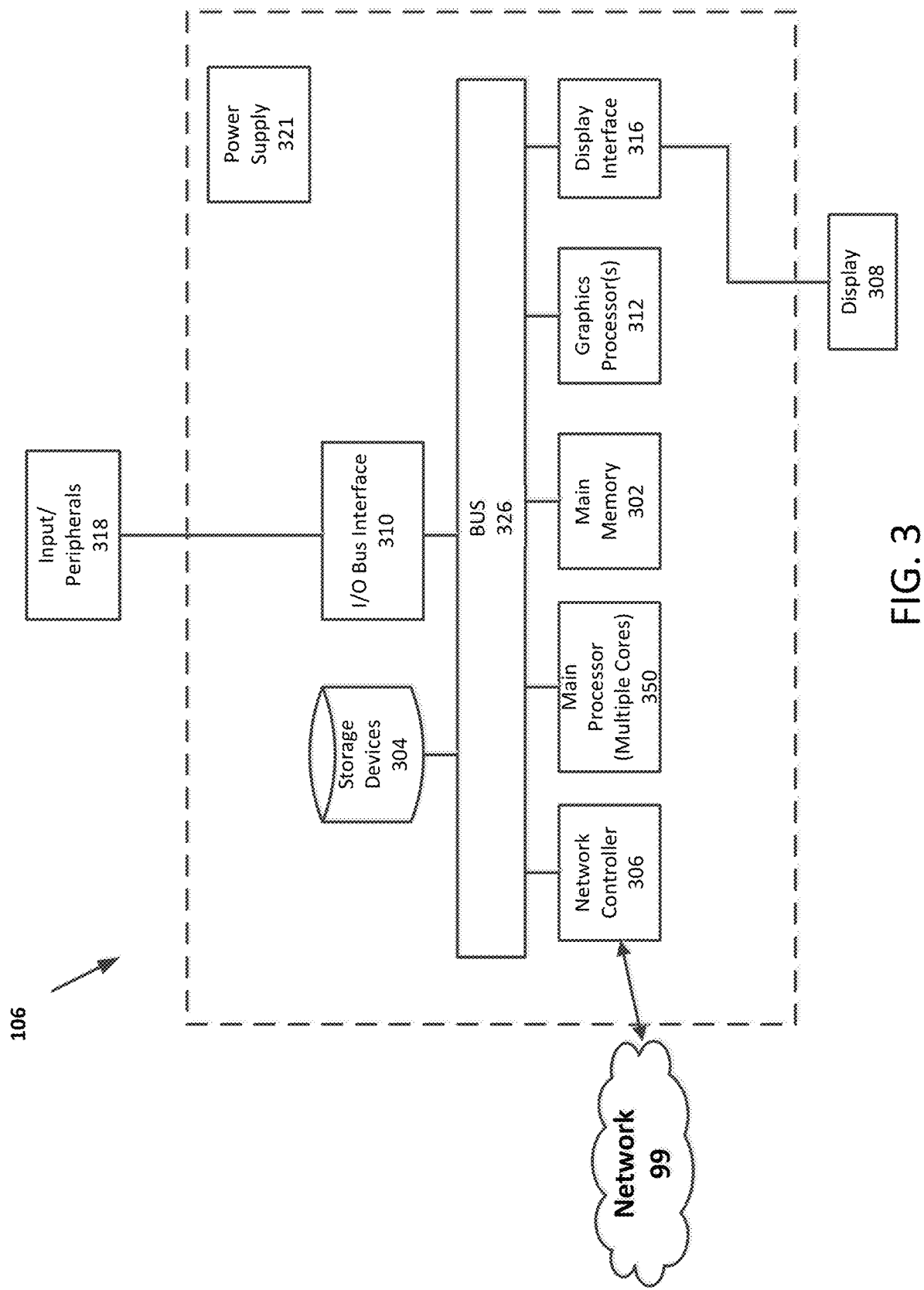
FIG. 3 is a block diagram of a computer system in accordance with an exemplary aspect of the disclosure.

FIG. 3 is a block diagram illustrating an example computer system for implementing the machine learning training and inference methods according to an exemplary aspect of the disclosure. The computer system 300 may be an AI workstation or laptop computer or personal computer configured with machine learning processing functions sufficient for training a deep learning machine learning model. The computer system 300 contains an operating system, for example Ubuntu Linux OS, Windows, a version of Unix OS, or Mac OS. The computer system 300 may include one or more central processing units (CPU) 350 having multiple cores. The computer system 300 may include a graphics board 312, or integrated graphics processors, having multiple GPUs, each GPU having GPU memory. The graphics board 312 may perform many of the mathematical operations of the disclosed machine learning methods. The computer system 300 includes main memory 302, typically random access memory RAM, which contains the software being executed by the processing cores 350 and GPUs 312, as well as a non-volatile storage device 304 for storing data and the software programs. Several interfaces for interacting with the computer system 300 may be provided, including an I/O Bus Interface 310, Input/Peripherals 318 such as a keyboard, touch pad, mouse, Display Adapter 316 and one or more Displays 308, and a Network Controller 306 to enable wired or wireless communication through a network 99. The interfaces, memory and processors may communicate over the system bus 326. The computer system 300 includes a power supply 321, which may be a redundant power supply.

In some embodiments, the computer system 300 is configured with a system on a chip (SoC) processor that includes a machine learning engine. An example SoC is the currently available Apple M1 or M2 processor, with includes a neural engine.

Burst Image Processing Network

The burst processing approach of the present disclosure is applied to different image restoration tasks, including burst super-resolution, burst low-light image enhancement and burst denoising. A goal is to generate a high-quality image by combining information from multiple degraded images captured in a single burst. The burst images are captured with an image capture circuit of a mobile device camera. The image capture circuit is substantially smaller than high-end high resolution cameras, such as DSLR and MILC cameras, described above. Also, the mobile device camera has a smaller lens and aperture than the high resolution cameras. The mobile device that houses or connects to the mobile device camera may include a smartphone or tablet computer, or other handheld multi-function communication device having a built-in camera.

Figure 4A:
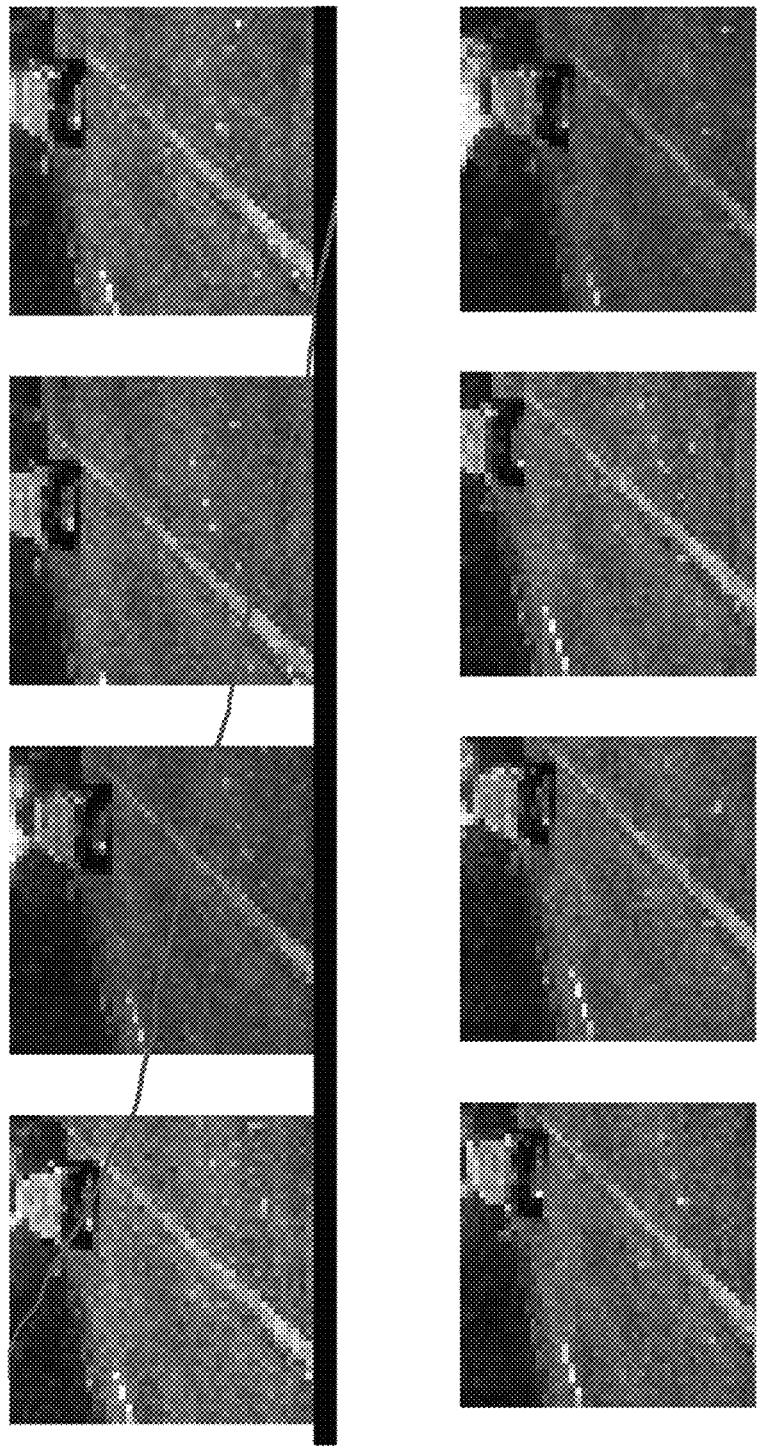

In capturing a burst image with a mobile device, interframe spatial and color misalignment issues may be encountered. FIGS. 4A, 4B is an exemplary raw image burst illustrating misalignment between multiple frames. Therefore, a challenge of burst image processing is to accurately align the burst frames. In it also beneficial to combine the complimentary information of the burst frames while preserving and reinforcing the shared attributes. To this end, embodiments of the present disclosure include a neural network architecture in which different modules operate in synergy to jointly perform denoising, demosaicking, feature fusion, and upsampling tasks, e.g., in a unified model.

Figure 5:
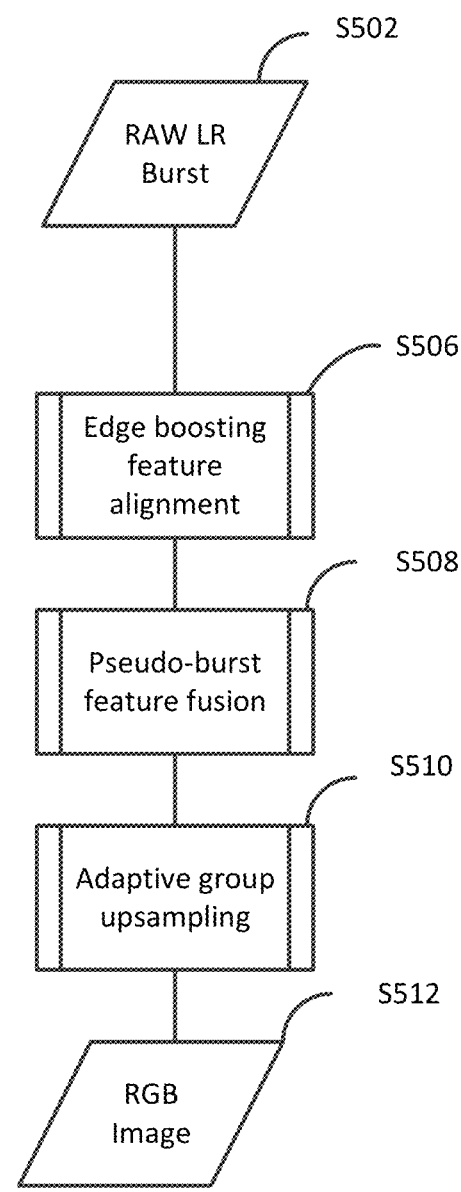
FIG. 5 is a flowchart for a burst image processing process in accordance with an exemplary aspect of the disclosure.

Overall pipeline. FIG. 5 is a high-level diagram of burst image processing of one aspect of the present disclosure. In disclosed embodiments, the burst image processing is performed in neural network engine 232. In the disclosed embodiments, the burst image processing may be implemented using a mobile application. The mobile application having program instructions may be stored in a non-transitory computer readable storage medium of the mobile device 102. In S502, a RAW image burst is input from a camera 240 operated in a burst mode. The processing concludes with, in S512, generating a high-quality RGB image as an output. The processing in the neural network engine 232 has three key stages: (1) S506, an edge boosting feature alignment stage to remove noise, and inter-frame spatial and color misalignment; (2) S508, a pseudo-burst feature fusion stage to enable inter-frame communication and feature consolidation; and (3) S510, an adaptive group upsampling stage to progressively increase spatial resolution while merging multi-frame information.

Figure 6:
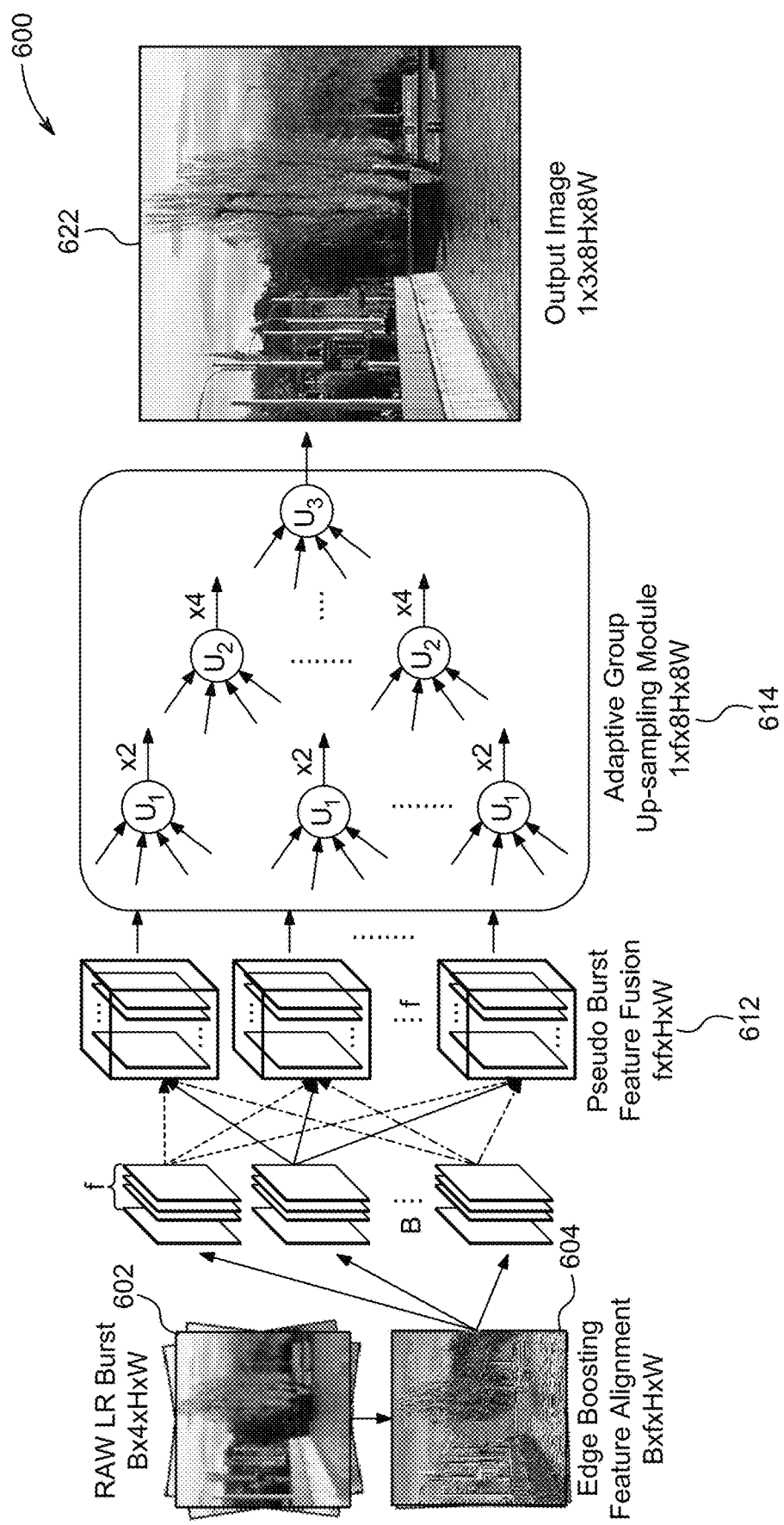
FIG. 6 is a diagram of a network architecture for burst image processing in accordance with an exemplary aspect of the disclosure.

FIG. 6 is an exemplary diagram of a network architecture for burst image processing. FIG. 6 shows the three main stages in the burst image processing neural network architecture 600. In this disclosure, the burst image processing neural network architecture 600 is also referred to as a burst image processing network, or BIPNet. The burst image processing network 600 includes the edge boosting feature alignment stage 604, the pseudo burst feature fusion stage 612, and the adaptive group upsampling stage 614. First, the input RAW burst image 602 obtained from a camera 240 operated in a burst mode is processed by the edge boosting feature alignment stage 604 to extract features, reduce noise, and remove spatial and color misalignment issues among the burst features to generate aligned burst feature maps. Second, a pseudo-burst feature fusion stage 612 generates a pseudo burst by exchanging information such that each feature map in the pseudo-burst now contains complimentary properties of all actual burst image features. Finally, the multi-frame pseudo-burst features are processed with the adaptive group upsampling stage 614 to produce the final high-quality image 622. In embodiments, the output of the neural network engine 232 via the burst image processing network 600 is a high resolution (HR) RGB image.

Edge Boosting Feature Alignment Stage

One major challenge in burst image processing is to extract features from multiple degraded images that are often contaminated with noise, unknown spatial displacements, and color shifts. These issues arise due to camera and/or object motion in the scene, and differences in lighting conditions between individual images of a burst. To align the other images in the burst with the base frame (usually the $1^{st}$ frame for simplicity) an alignment stage 604 is used that is based on modulated deformable convolutions. See Zhu et al. However, conventional deformable convolution is not explicitly designed to handle noisy RAW data. Therefore, a feature processing module, described below, reduces noise in the initial burst features. An edge boosting feature alignment (EBFA) stage 604 consists of feature processing followed by burst feature alignment.

Feature Processing Module

Figure 7:
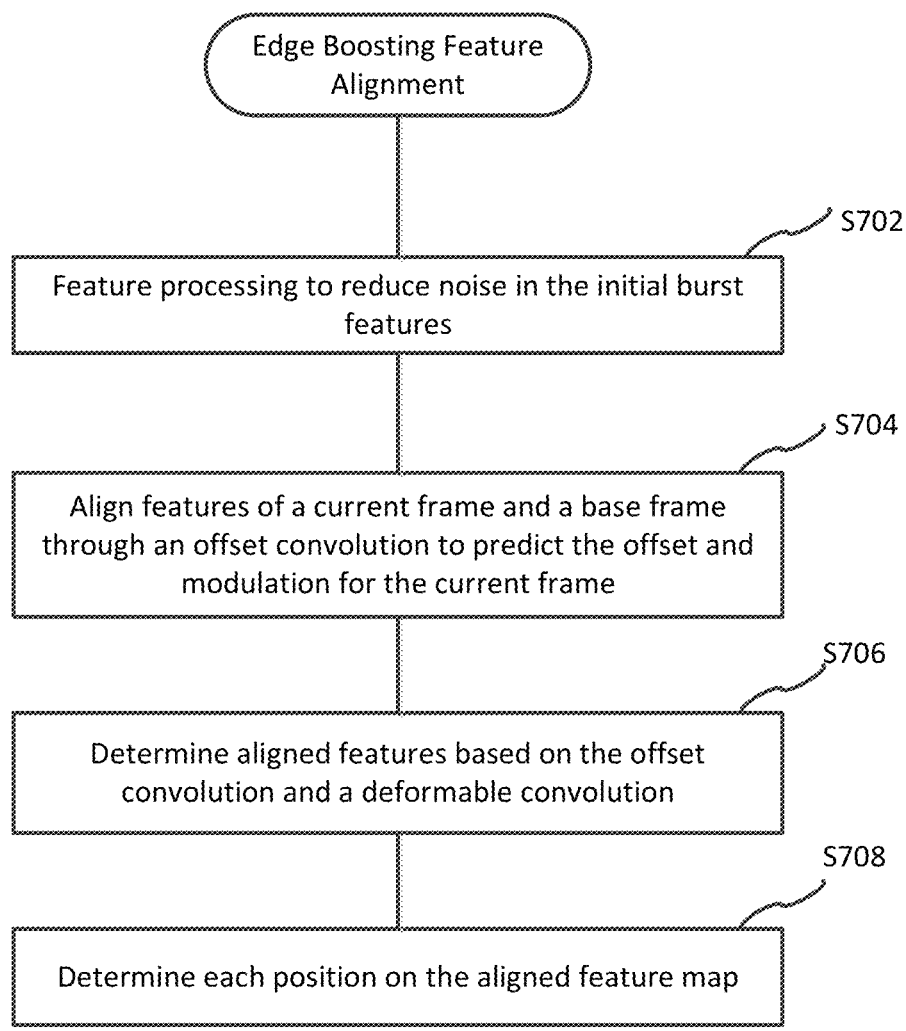
FIG. 7 is a flowchart for edge boosting feature alignment in accordance with an exemplary aspect of the disclosure.

FIG. 7 is a flowchart for edge boosting feature alignment in accordance with an exemplary aspect of the disclosure. In disclosed embodiments, the edge boosting feature alignment stage 604 is performed in neural network engine 232. In S702, feature processing is initially performed to reduce noise in the burst features. In S704, the edge boosting feature alignment (EBFA) stage 604 is performed to align all other images in the input burst to the base frame. In S706, feature processing is performed to determine aligned features based on an offset convolution and a deformable convolution. In S708, feature processing is performed to determine each position on the aligned feature map.

Figure 8:
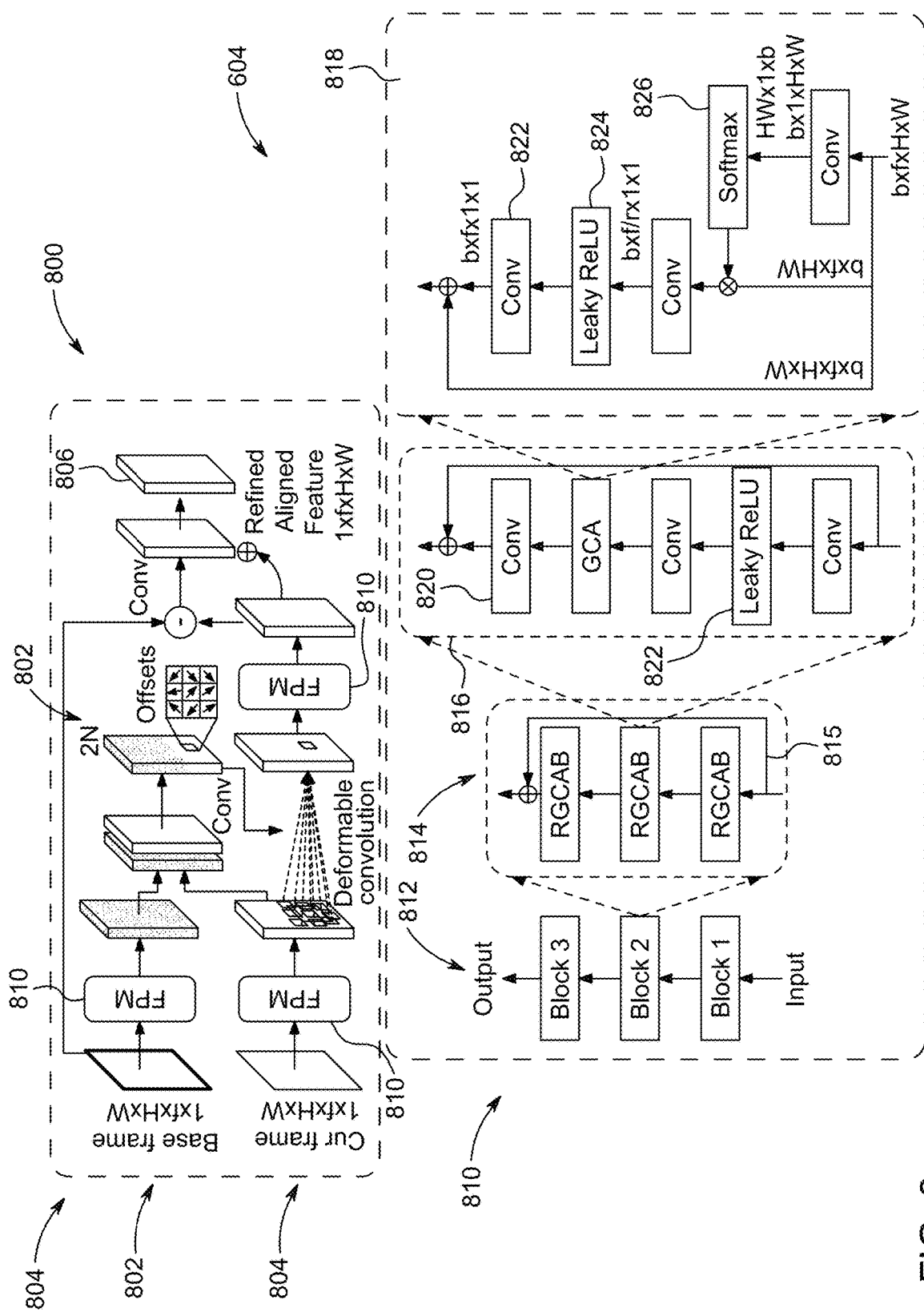
FIG. 8 is a diagram of a network architecture for edge boosting feature alignment, including a feature processing module, of the network architecture of FIG. 6.

FIG. 8 is a diagram of a network architecture for edge boosting feature alignment 604, including a feature processing module to perform feature processing, of the network architecture of FIG. 6. Feature processing module 810 (FPM) is included in EBFA 800 to denoise input frames to facilitate the easy alignment. In FIG. 8, ⊗ represents matrix multiplication.

The feature processing module (FPM 810), shown in FIG. 8, employs residual-in-residual learning (814) that allows abundant low-frequency information to pass easily via skip connections (815). See Zhang et al., ECCV, 2018, which proposed a residual in residual (RIR) structure to form a very deep network, which consists of several residual groups with long skip connections. Each residual group contains some residual blocks with short skip connections. The RIR allows abundant low-frequency information to be bypassed through multiple skip connections, making the main network focus on learning high-frequency information.

Since capturing long-range pixel dependencies which extracts global scene properties has been shown to be beneficial for a wide range of image restoration tasks (e.g., image/video super-resolution and extreme low-light image enhancement), a global context attention 818 (GCA) mechanism is used to refine the latent representation produced by residual block, as illustrated in FIG. 8. See Syed Waqas Zamir, Aditya Arora, Salman Khan, Munawar Hayat, Fahad Shahbaz Khan, and Ming-Hsu Yang. Restormer: Efficient transformer for high-resolution image restoration. In *CVPR*, 2022; Yiqun Mei, Yuchen Fan, Yuqian Zhou, Lichao Huang, Thomas S Huang, and Honghui Shi. Image super-resolution with cross-scale non-local attention and exhaustive self-exemplars mining. In *CVPR*, 2020; and Aditya Arora, Muhammad Haris, Syed Waqas Zamir, Munawar Hayat, Fahad Shahbaz Khan, Ling Shao, and Ming-Hsuan Yang. Low light image enhancement via global and local context modeling. arXiv: 2101.00850, 2021, each incorporated herein by reference in their entirety. Let $\{x^b\}_{b\in[1:B]} \in \mathbb{R}^{B\times f\times H\times W}$ be an initial latent representation of the burst having B burst images and f number of feature channels, the residual global context attention block 816 (RGCAB in FIG. 8 is defined as:

$$y^b = x^b + W_1(\alpha(\bar{x}^b)), \qquad (1)$$

where $\bar{x}^b = W_3(\gamma(W_3(x^b)))$ and $\alpha(\bar{x}^b) = \bar{x}^b + W_1(\gamma(W_1(\Psi(W_1(\bar{x}^b))\otimes \bar{x}^b)))$. Here, $W_k$ represents a convolutional layer 820 with k×k sized filters and each $W_k$ corresponds to a separate layer with distinct parameters, γ denotes leaky ReLU activation 822, Ψ is softmax activation, ⊗ represents matrix multiplication, and α(•) is the global context attention 818.

Burst Feature Alignment Stage

To effectively fuse information from multiple frames, these frame-level features are first aligned. The features of the current frame $y^b$ 804 are aligned with the base frame 702 $y^{br}$. In one embodiment, the base frame is the first input burst image. However, other burst images may be used as a base frame. EBFA 800 processes $y^b$ and $y^{br}$ through an offset convolution layer 802 and predicts the offset $\Delta n$ and modulation scalar $\Delta m$ values for $y^b$. The aligned features $\bar{y}^b$ computed as:

$$\bar{y}^b = W^d(y^b, \Delta n, \Delta m), \Delta m = W^o(y^b, y^{br}), \quad (2)$$

where, $W^d$ and $W^o$ represent the deformable 804 and offset convolutions, respectively. More specifically, each position n on the aligned feature map $\bar{y}^b$ is obtained as:

$$\bar{y}_n^b = \sum_{i=1}^{K} W_{n_1}^d y_{(n+n_1+\Delta n_1)}^b \cdot \Delta m_{n_1} \quad (3)$$

where, K=9, $\Delta m$ lies in the range [0, 1] for each $n_i \in \{(-1, 1), (-1, 0), \ldots, (1, 1)\}$ is a regular grid of 3×3 kernel.

The convolution operation is performed on the non-uniform positions $(n_i + \Delta n_i)$, where $n_i$ can be fractional. To avoid fractional values, the convolution operation is implemented using bilinear interpolation.

The EBFA module 800 is based on a deformable alignment module (DAM). See Tian et al., *CVPR*, 2020. The EBFA module 800 has made changes to the conventional DAM. The conventional DAM approach does not provide explicit ground-truth supervision to the alignment module, instead it learns to perform implicit alignment. Unlike the conventional DAM, to strengthen the feature alignment and to correct the minor alignment errors, using FPM 810, refined aligned features 806 (RAF) are obtained followed by computing the high-frequency residue by taking the difference between the RAF 806 and base frame features and add it to the RAF. The overall process of the EBFA module 800 is summarized as: $e^b = \bar{y}^b + W_3(\bar{y}^b - y^{br})$ where $e^b \in \mathbb{R}^{B \times f \times H \times W}$ represents the aligned burst feature maps, and W3( ) is the convolution. Although the deformable convolution 804 is shown only once in FIG. 8 for brevity, three such layers are sequentially aligned to improve the transformation capability of the EBFA module 800.

PseudoBurst Feature Fusion Stage

Figure 9:
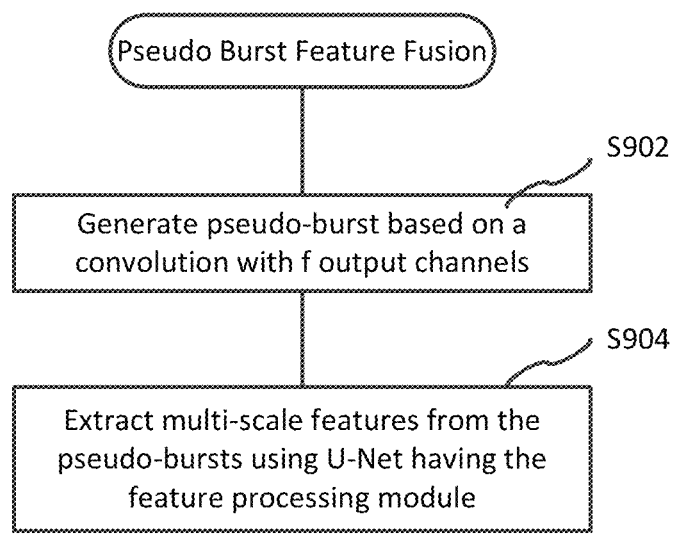
FIG. 9 is a flowchart for pseudo burst feature fusion in accordance with an exemplary aspect of the disclosure.

FIG. 9 is a flowchart for pseudo burst feature fusion in accordance with an exemplary aspect of the disclosure. In disclosed embodiments, the pseudo burst feature fusion stage 612 is performed in the neural network engine 232. In S902, a pseudo-burst is generated by exchanging information across frames such that each feature tensor in the pseudo-burst contains complimentary properties of all frames. In S904, pseudo bursts are processed with (shared) a U-Net to extract multi-scale features.

Figure 10:
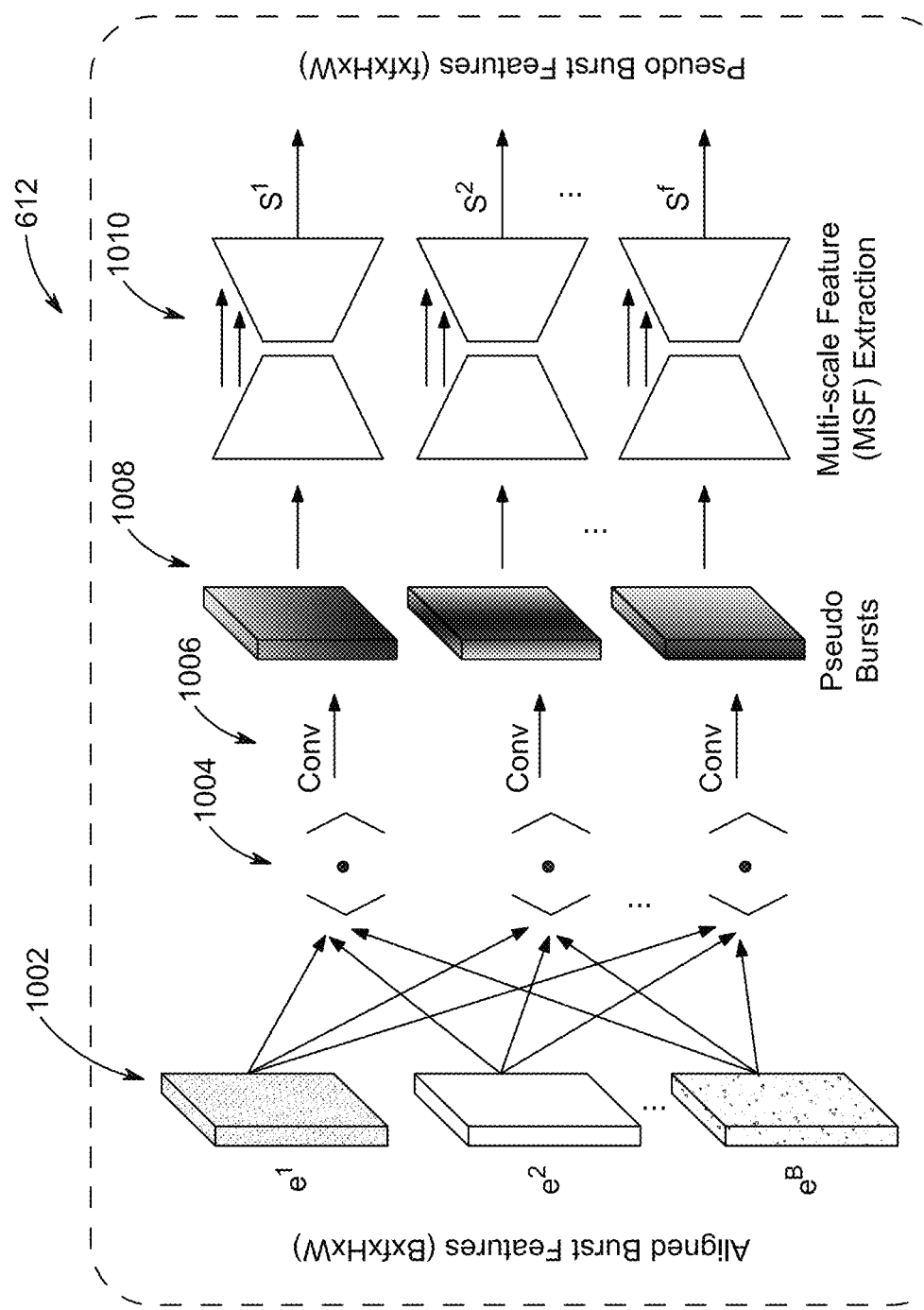
FIG. 10 is a diagram of a network architecture for pseudo burst feature fusion of the network architecture of FIG. 6.

FIG. 10 is a diagram of a network architecture for pseudo burst feature fusion of the network architecture of FIG. 6.

Conventional burst image processing techniques separately extract and align features of burst images and usually employ late feature fusion mechanisms, which can hinder flexible information exchange between frames. See Bhat et al., *CVPR*, 2021 and Bhat at al., *ICCV*, 2021. Embodiments of the present disclosure include a pseudo-burst feature fusion (PBFF) stage 612 (see FIG. 10). The PBFF module 612 generates feature tensors by concatenating (concatenation 1004) the corresponding channel-wise features from all burst feature maps 1002. Subsequently, each feature tensor in the pseudo-burst contains complimentary properties of all actual burst image features. Processing inter-burst feature responses simplifies the representation learning task and merges the relevant information by decoupling the burst image feature channels. In particular, given the aligned burst feature set 1002

$$e = \{e_c^b\} \begin{array}{l} b \in [1:B] \\ c \in [1:f] \end{array}$$

of burst size B and f number of channels, the pseudo-burst 1008 is generated by, $$S^c = W^p(\langle e_c^1, e_c^2, \ldots, e_c^B \rangle), s \cdot t \cdot c \in [1:f], \quad (4)$$

where, $\langle \cdot \rangle$ (1004) represents concatenation, $e_c^1$ is the $c^{th}$ feature map of $1^{st}$ aligned burst feature set 1002 $e^1$, $W^p$ is the convolution layer 906 with f output channel, and S = $\{S^c\}_{c \in [1:f]}$ represents the pseudo-burst of size f×f×H×W. f=64.

Even after generating pseudo-bursts 908, obtaining their deep representation is preferable. The PBFF 612 consists of multi-scale feature (MSF) extraction module 1010 which is made up of a light-weight 3-level U-Net. See Olaf Ronneberger, Philipp Fischer, and Thomas Brox. UNet: convolutional networks for biomedical image segmentation. In *MICCAI*, 2015, incorporated herein by reference in its entirety.

The original U-Net gets its name as it has a u-shaped architecture. The U-Net architecture consists of a contracting path and an expansive path. The expansive path has an upsampling part and a large number of feature channels, which allow the network to propagate context information to higher resolution layers. As a consequence, the expansive path is more or less symmetric to the contracting path, giving rise to the u-shaped architecture.

The contracting path follows the typical architecture of a convolutional network. It includes the repeated application of two 3×3 convolutions (unpadded convolutions), each followed by a rectified linear unit (ReLU) and a 2×2 max pooling operation with stride 2 for downsampling. At each downsampling step the number of feature channels is doubled.

Every step in the expansive path includes an upsampling of the feature map followed by a 2×2 convolution ("up-convolution") that halves the number of feature channels, a concatenation with the correspondingly cropped feature map from the contracting path, and two 3×3 convolutions, each followed by a ReLU. At the final layer a 1×1 convolution is used to map each 64-component feature vector to the desired number of classes.

Unlike the original U-net, the light-weight U-Net of the multi-scale feature (MSF) extraction module 1010 is used to extract multi-scale features from pseudo-bursts 1008. The light-weight U-Net uses shared weights. Also, the light-weight U-Net employs the FPM instead of regular convolutions. One FPM (with 2 RiR and 2 RGCAB in each RiR) is employed after each downsample and upsample convolution layer. The number of convolution filters are increased by a factor of 1.5 at each downsampling step and decreased by the rate of 1.5 after each upsampling operation. Features extracted at each level are added to the up-sampled features via skip connections.

Adaptive Group Up-Sampling Stage

Up-sampling is a final step of the burst image processing to generate the super-resolved image from LR feature maps. Conventional burst SR methods use a pixel-shuffle layer to perform up-sampling in one-stage. See Bhat et al., *CVPR*, 2021, Bhat at al., ICCV, 2021; and Shi et al. However, in burst image processing, information available in multiple frames can be exploited effectively to get into High Resolution (HR) space. To this end, the up-sampling stage adaptively and progressively merges multiple LR features. For instance, on the one hand it is beneficial to have uniform fusion weights for texture-less regions in order to perform denoising among the frames. On the other hand, to prevent ghosting artifacts, it is desirable to have low fusion weights for any misaligned frame.

Figure 11:
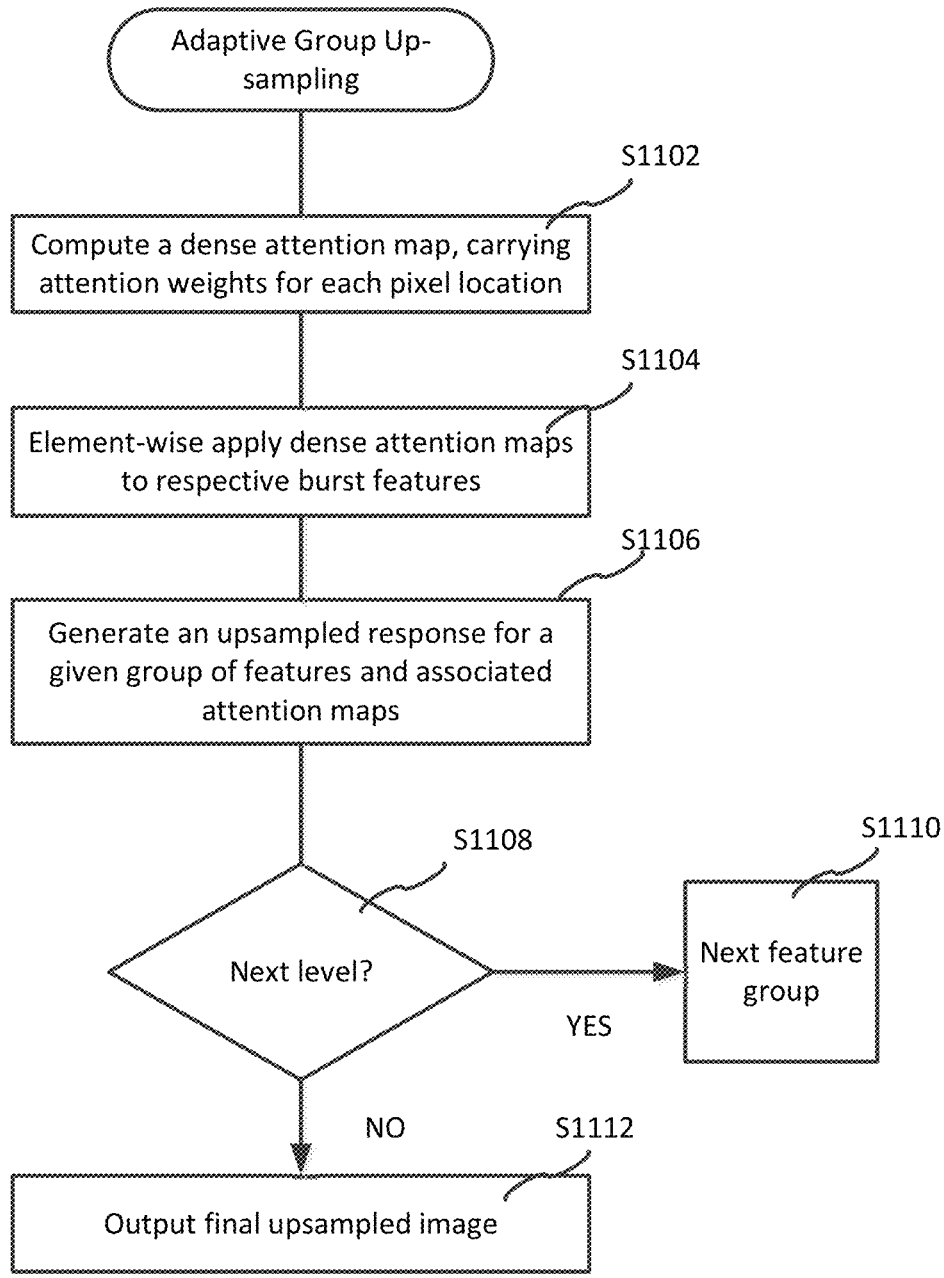
FIG. 11 is a flowchart of adaptive group up-sampling in accordance with an exemplary aspect of the disclosure.

FIG. 11 is a flowchart of adaptive group up-sampling in accordance with an exemplary aspect of the disclosure. In disclosed embodiments, the adaptive group upsampling stage 614 is performed in the neural network engine 232. In step S1102, a dense attention map is computed, carrying attention weights for each pixel location. In step S1104, dense attention maps are element-wise applied to respective burst features. In step S1106, an up-sampled response is generated for a given group of features and associated attention maps. If there are more levels (YES in S1108), in step S1110, go to the next level. Otherwise, in step S1112, a final up-sampled image is outputted.

Figure 12A:
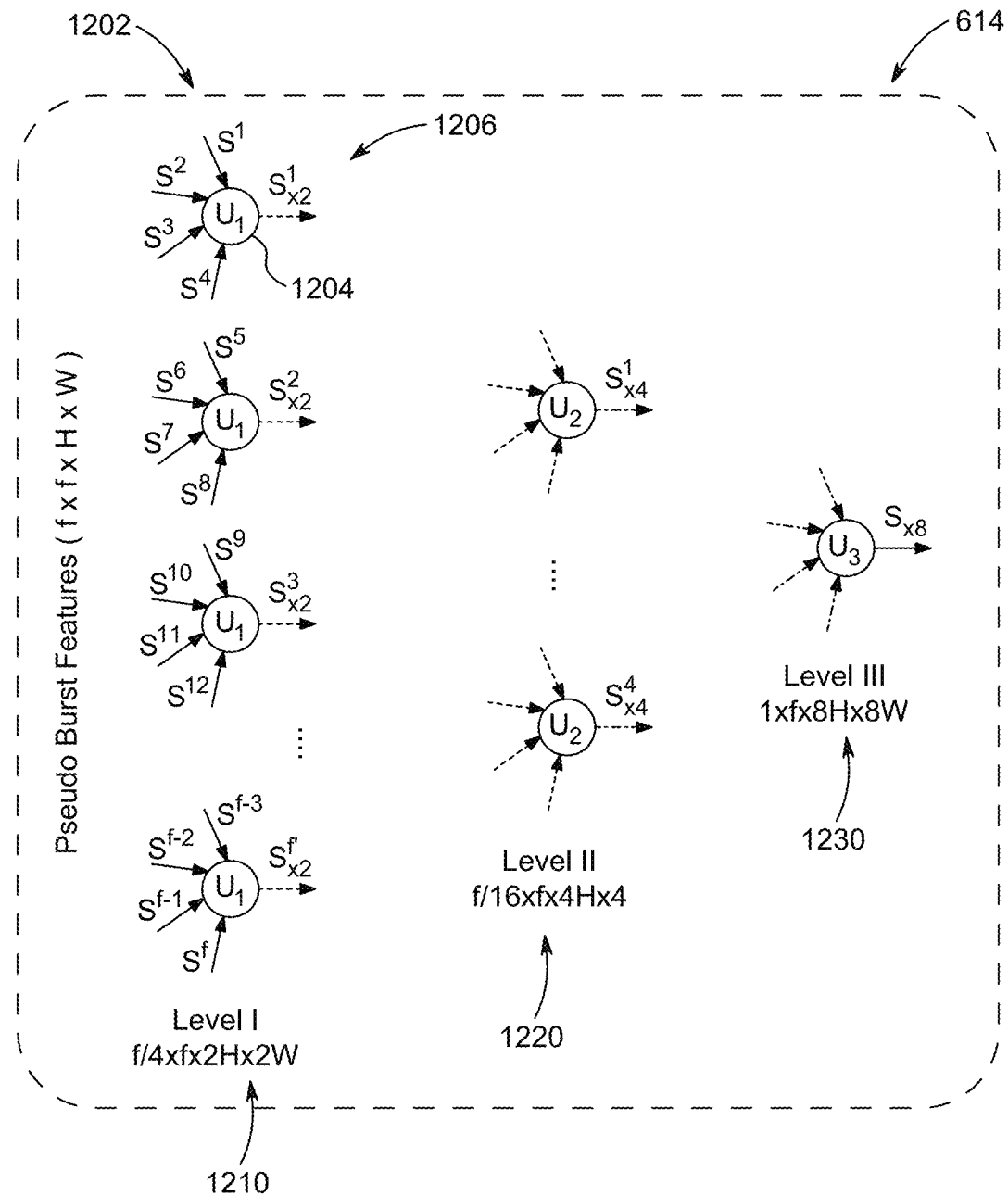
FIG. 12A is a diagram of a network architecture for adaptive group up-sampling.

FIG. 12A shows the adaptive group up-sampling (AGU) module 614 that takes as input the feature maps $S = \{S^c\}_{c \in [1:f]}$ produced by the pseudo-burst fusion module 612 and provides a super-resolved output 622 via three-level progressive up-sampling. In AGU 614, the pseudo-burst features 1202 are sequentially divided into groups of 4, instead of following any complex selection mechanism. These groups of features are up-sampled with the architecture depicted in FIG. 12B that computes a dense attention map 1256 ($\alpha^c$), carrying attention weights for each pixel location. The dense attention maps 1156 are element-wise applied 1258 to the respective pseudo-burst features 1202. Finally, the up-sampled response 1206 for a given group of features $\hat{S}^g = \{S^i : i \in [(g-1)*4+1:g*4]\}^{g \in [1:f/4]} \otimes S$ and associated attention maps $\hat{a}^g$ at the first upsampling level (Level I in FIG. 12A) is formulated as:

$$S_{\times 2}^g = W_T((\hat{S}^g \odot \hat{a}^g)), \quad (5)$$

$$\hat{a}^g = \psi\left(W_1\left(W_1\left(\sum_{i=(g-1)*4+1}^{g*4} S^i\right)\right)\right),$$

where $\psi(\cdot)$ denotes the softmax activation function 1254, $W_T$ is the 3×3 Transposed convolution layer 1260, and $\hat{a}^g \in \mathbb{R}^{4 \times f \times H \times W}$ represents the dense attention map 1256 for $g^{th}$ burst feature response group 1202 ($\hat{S}^g$).

Figure 12B:
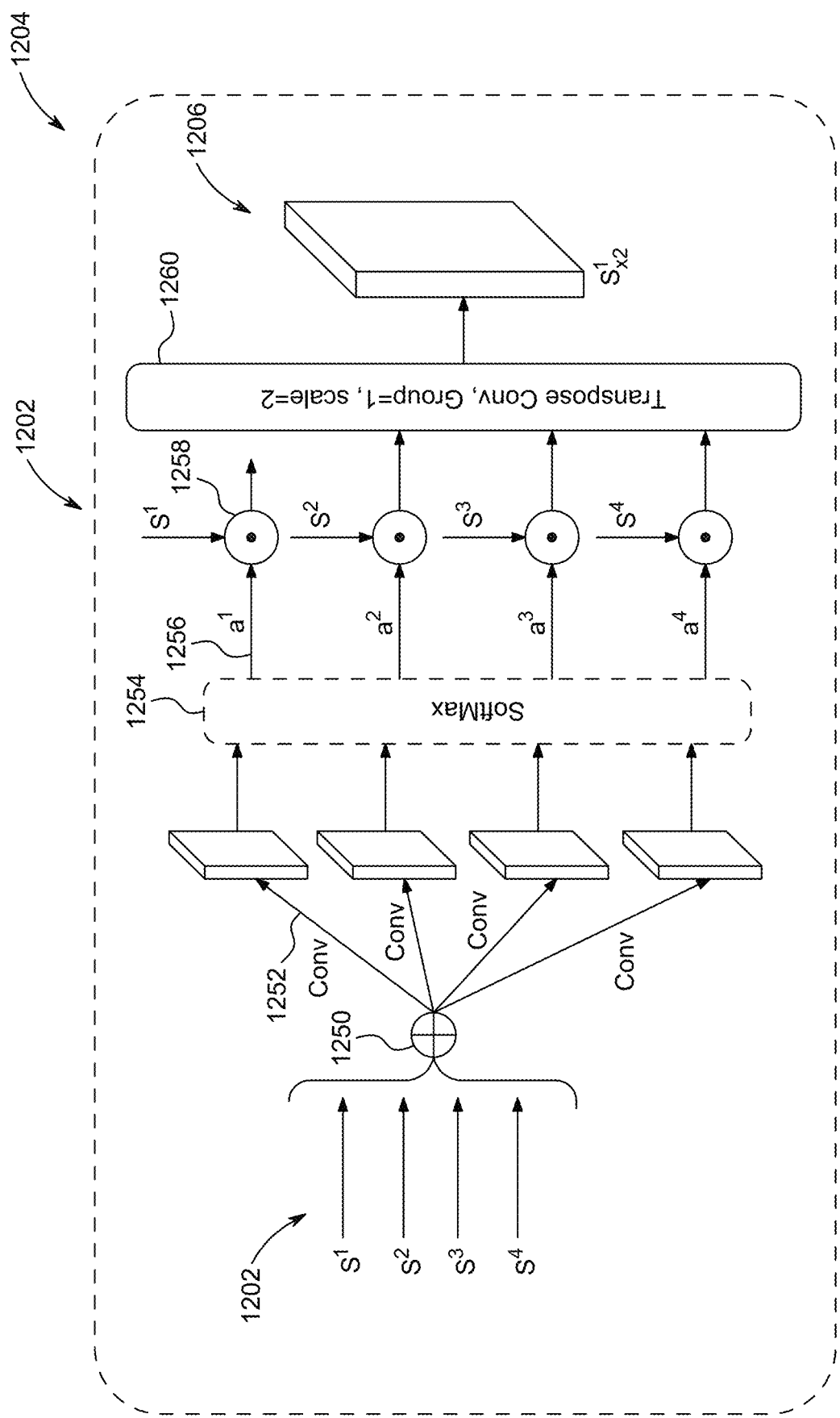
FIG. 12B is a network architecture for the up-sampler, of the network architecture of FIG. 5.

Regarding FIG. 12B, the upsampler 1204 of the AGU module 614 aggregates 1250 the input group of pseudo bursts 1202 and passes them through a bottleneck convolution layer of kernel size 1×1 followed by a set of four parallel convolution layers 1252, each with kernel size of 1×1 and 64 filters. Further, the outputs from the convolution layers 1252 are passed through the softmax activation 1254 to obtain the dense attention maps 1256.

To perform burst SR of scale factor ×4, factor ×8 up-sampling needs to be performed (additional ×2 is due to the mosaicked RAW LR frames). Thus, in AGU 614 three levels of ×2 up-sampling are applied. As, the network generates 64 pseudo bursts, this naturally forms 16, 4 and 1 feature groups at levels I, II, and III, respectively. In one embodiment, the up-sampler 1204 at each level is shared among groups to avoid an increase in network parameters.

Figure 13:
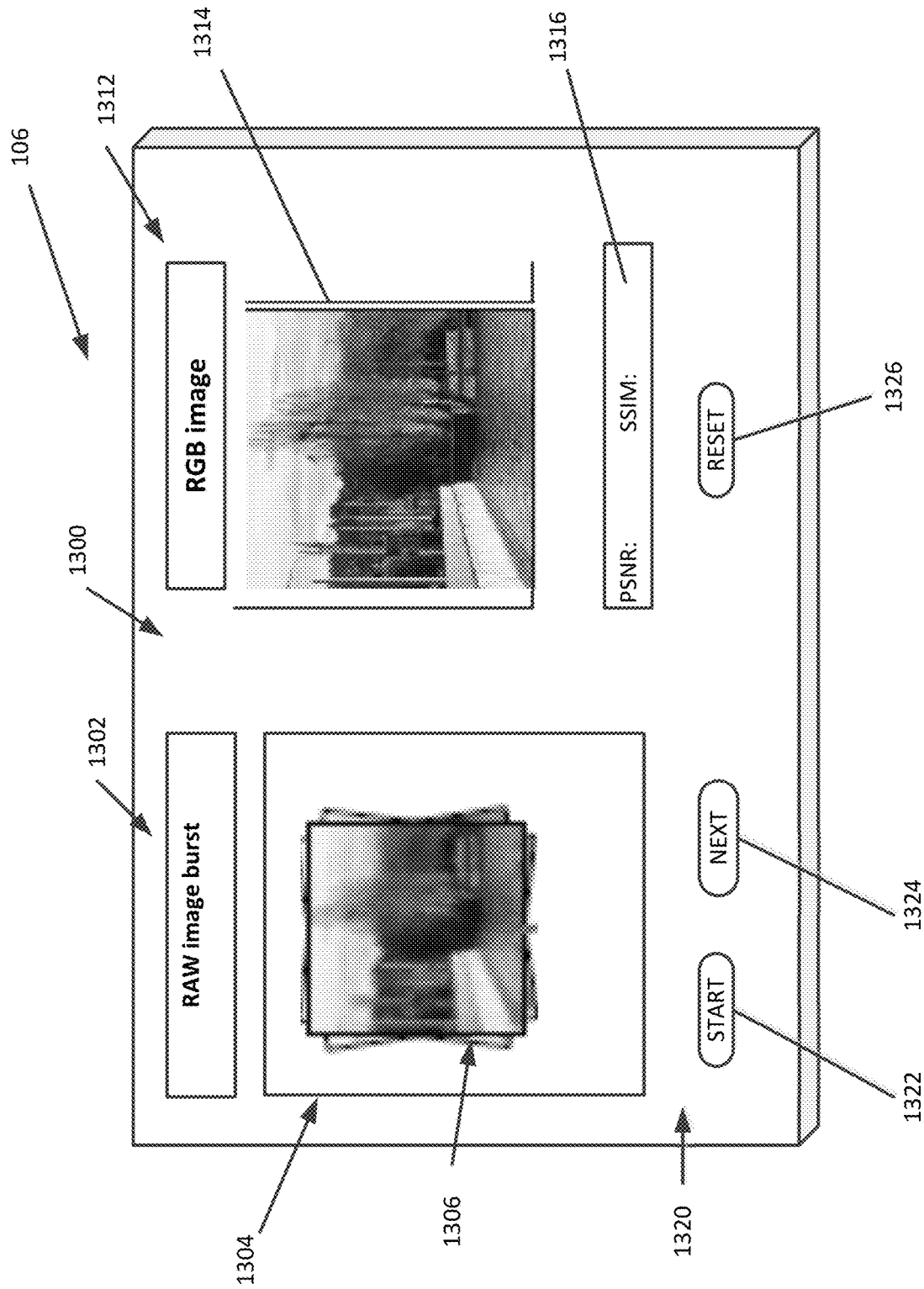
FIG. 13 illustrates an example display screen for interacting with the burst image processing network in accordance with an exemplary aspect of the disclosure.

FIG. 13 illustrates an example display screen for interacting with the burst image processing network 600. In a workstation 106 for training and evaluating the burst image processing network 600, the workstation 106 includes an interactive display 1300. The display 1300 may include a section for RAW image burst 1302, a section for RGB image 1312, and a control section 1320. The RAW image burst section 1302 may include a display area 1304 for displaying a RAW image burst 1306. The RGB image section 1312 may display an RGB image 1314. The control section 1320 may contain controls for controlling the display in the display area 1304 and RGB image 1314. The RGB image section 1312 may also include a display area 1316 for displaying performance metrics. The controls in the control section 1320 may include a start function 1322 and a reset function 1326. The start function 1322 is for taking the image burst 1306 displayed in the RAW image burst section 1304 as an input to the burst image processing network 600 and performing burst image processing to obtain a resulting RGB image that is then displayed as the RGB image 1314. The reset function 1326 will remove the RGB image 1314 and reset the burst image processing network 600 for again processing a RAW image burst. The control section 1320 may also include a Next function 1324 for scrolling through individual images in the image burst 1306. In addition, a control may include a select function to choose a particular image in the image burst, by for example inputting an image number.

In some embodiments, the trained burst image processing network 600 may be implemented as a mobile application (App) that may be downloaded and installed on a smartphone or tablet computer 102. Such an implementation constitutes a computer program including instructions that can be performed on the computer processing system 201 of a smartphone or tablet computer 102. Embodiments of the burst image processing network 600 are implemented using PyTorch. However, the burst image processing network 600 may be implemented using other machine learning frameworks, such as TensorFlow, MATLAB+, to name a few.

Figure 14:
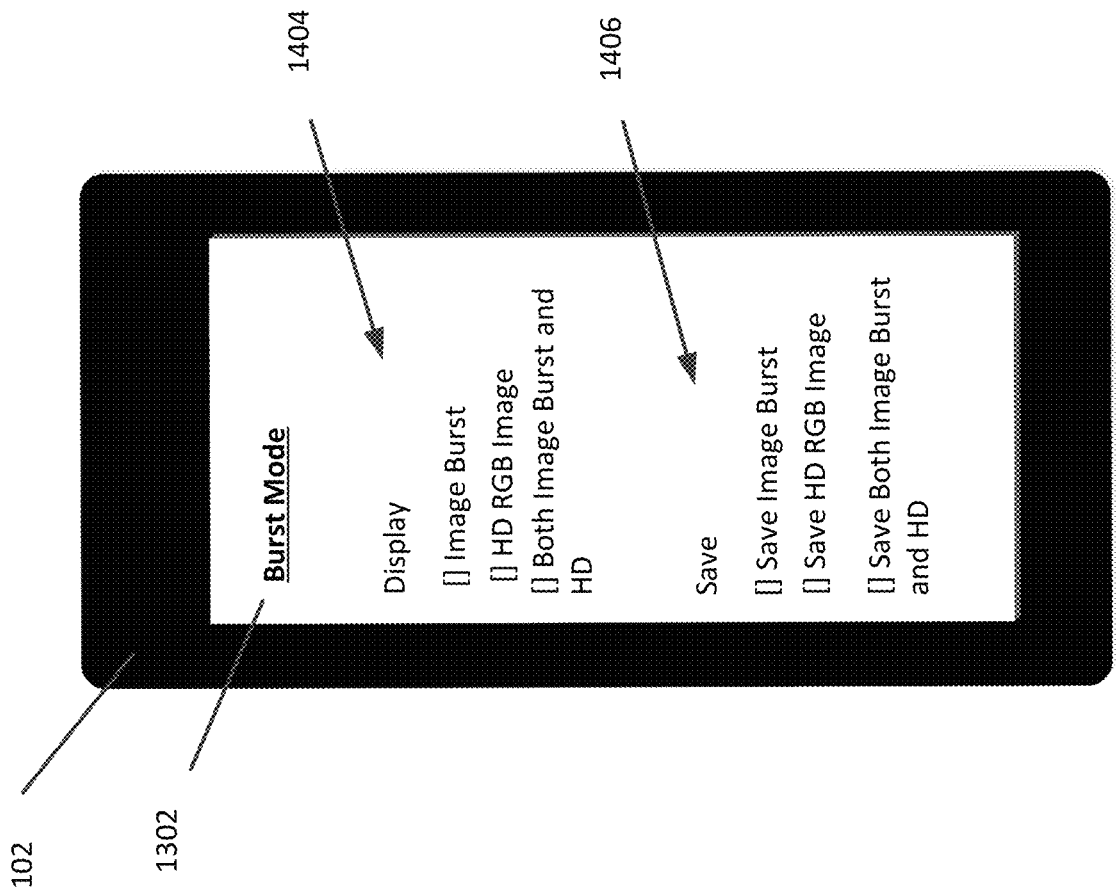
FIG. 14 illustrates a settings display in a smartphone or tablet computer in accordance with an exemplary aspect of the disclosure.

FIG. 14 illustrates a settings display in a smartphone or tablet computer. In embodiments, the burst image processing network 600 is processed by the computer processing system 201 of a smartphone or tablet computer 102 to take an image burst as an input and supply an output HD RGB image. Upon performing the image burst mode with the smartphone or tablet computer, the smartphone or tablet computer 102 can be set to display the image burst, or may be set to display the output HD RGB image, or set to display an image burst side-by-side with the output HD RGB image. The smartphone or tablet computer 102 may be set to automatically store the image burst, the HD RGB image, or both the image burst and HD RGB image, in a memory of the smartphone or tablet computer 102.

The smartphone or tablet computer 102 may include a settings screen 1402 in which display settings 1404 and save settings 1406 can be set for image burst mode. In embodiments, the settings may be preset with default settings, that may be changed in the settings screen 1402. In some embodiments, the settings for image burst mode may include an option to only display the HD RGB image without automatically storing the HD RGB image in a memory of the smartphone or tablet computer 102, for example, in a preview mode.

Figure 15:
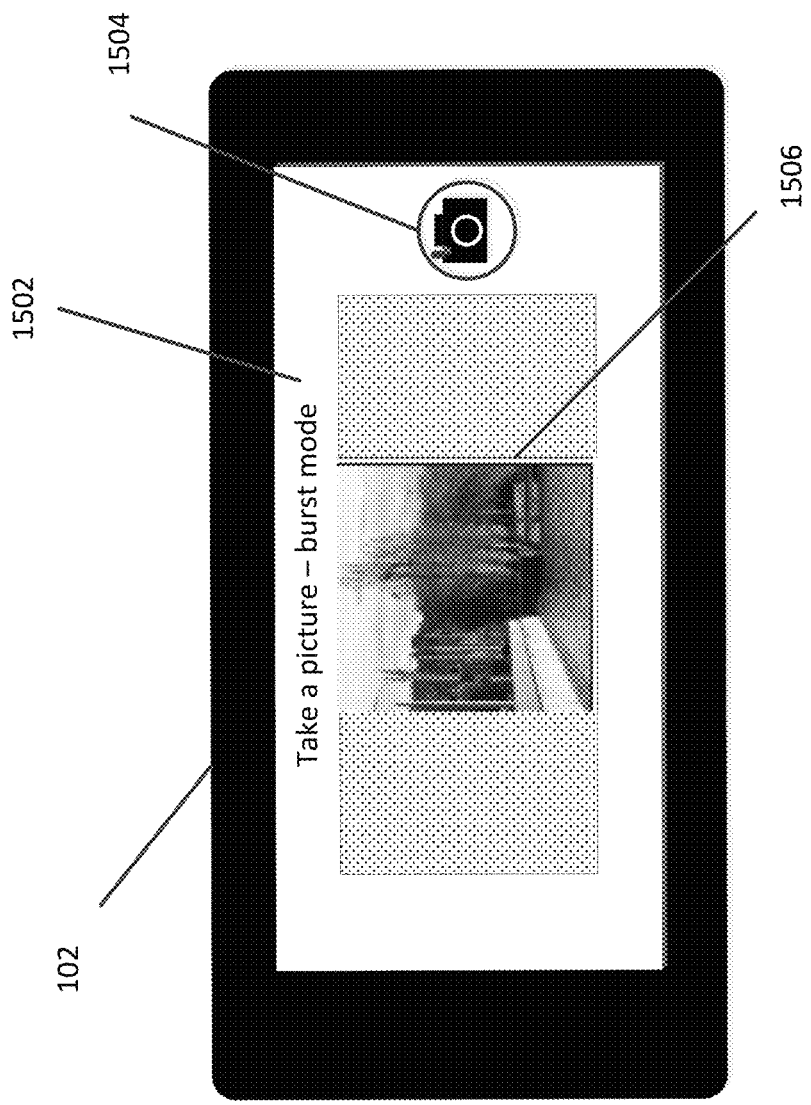
FIG. 15 illustrates an image display for a smartphone or tablet computer in accordance with an exemplary aspect of the disclosure.

FIG. 15 illustrates an image display for a smartphone or tablet computer. Upon performing the image burst mode with the smartphone or tablet computer, the smartphone or tablet computer 102 can display in an image display 1502 the output HD RGB image 1506, instead of an image burst. In some embodiments, the image burst mode may be performed by invoking an image burst function 1504 of the smartphone (tablet computer) camera.

EXAMPLES

The burst image processing network 600 and other state-of-the-art approaches are evaluated on real and synthetic datasets for (a) burst super-resolution, (b) burst low-light image enhancement, and (c) burst denoising.

Implementation Details. The burst image processing network 600 can be implemented for inference on most smartphones and tablet computers. Training can be performed on a workstation or laptop computer equipped with a multi-core GPU as a minimum, but preferably on a workstation or laptop computer having a specialized processor for machine learning. Training can also be performed in a cloud service that provides support for machine learning.

An example implementation is an iPhone having three cameras, including a wide camera, and ultra-wide camera and a telephoto camera. A reason for the three cameras is to offer 3 different angle-of-views. The wide camera has a sensor area of about 44 mm$^2$ with a 26 mm lens. The ultra-wide camera has a sensor area of about 12 mm$^2$ with a 13 mm lens. The telephoto camera has a sensor area of about 12 mm$^2$ with a 77 mm lens. The processor that may be used to for implementing the burst image processing network 500 on an iPhone processor is the Apple A15 system on a chip. The burst image processing network 500 has been implemented using the NTIRE21_BURSTSR toolkit, PyTorch, and other python libraries.

The burst image processing network 600 has been developed to be end-to-end trainable and needs no pretraining of any module. For network parameter efficiency, all burst frames are processed with shared burst image processing modules (FPM 810, EBFA 800, PBFF 612 and AGU 614). Overall, the burst image processing network 600 contains 6.67M parameters. A separate model is trained for burst SR, burst low-light image enhancement and burst denoising using $L_1$ loss only. While for SR on real data, the burst image processing network 600 is trained with pre-trained weights on SyntheticBurst dataset using aligned $L_1$ loss. See Bhat et al., *CVPR*, 2021. The models are trained with Adam optimizer. Cosine annealing strategy is employed to steadily decrease the learning rate from $10^{-4}$ to $10^{-6}$ during training. See Ilya Loshchilov and Frank Hutter. Sgdr: Stochastic gradient descent with warm restarts. arXiv: 1608.03983, 2016, incorporated herein by reference in its entirety. Horizontal and vertical flips are used for data augmentation.

Burst Super-Resolution

SR experiments are performed for scale factor ×4 on the SyntheticBurst and (real-world) BurstSR datasets. See Bhat et al., *CVPR*, 2021.

Datasets. (1) SyntheticBurst dataset consists of 46,839 RAW bursts for training and 300 for validation. Each burst contains 14 LR RAW images (each of size 48×48 pixels) that are synthetically generated from a single sRGB image. Each sRGB image is first converted to the RAW space using the inverse camera pipeline. See Tim Brooks, Ben Mildenhall, Tianfan Xue, Jiawen Chen, Dillon Sharlet, and Jonathan T Barron. Unprocessing images for learned raw denoising. In CVPR, 2019, incorporated herein by reference in its entirety. Next, the burst is generated with random rotations and translations. Finally, the LR burst is obtained by applying the bilinear downsampling followed by Bayer mosaicking, sampling and random noise addition operations. (2) BurstSR dataset consists of 200 RAW bursts, each containing 14 images. To gather these burst sequences, the LR images and the corresponding (ground-truth) HR images are captured with a smartphone camera and a DSLR camera, respectively. From 200 bursts, 5,405 patches are cropped for training and 882 for validation. Each input crop is of size 80×80 pixels.

SR results on synthetic data. The burst image processing network 600 is trained for 300 epochs on training set while evaluated on validation set of SyntheticBurst dataset. See Bhat et al., *CVPR*, 2021. The burst image processing network 600 is compared with several burst SR methods such as High-ResNet, DBSR, LKR, and MFIR for 4 upsampling. See Deudon et al.; Bhat et al., *CVPR*, 2021; Lecouat et al.; and Bhat at al., *ICCV*, 2021. Table 1 shows that the burst image processing network 600 performs favorably well. Specifically, the burst image processing network 600 achieves Peak signal-to-noise ratio (PSNR) gain of 0.37 dB over the previous best method MFIR and 0.48 dB over the second best approach. See Bhat at al., *ICCV*, 2021; Lecouat et al. It is noted that PSNR is generally defined as the ratio between the maximum possible power of an image and the power of corrupting noise that affects the quality of its representation.

TABLE 1

Performance evaluation on synthetic and real burst validation sets for ×4 burst super-resolution.

| Methods | SyntheticBurst | | (Real) BurstSR | |
| --- | --- | --- | --- | --- |
| | PSNR↑ | SSIM↑ | PSNR↑ | SSIM↑ |
| Single Image | 36.17 | 0.909 | 46.29 | 0.982 |
| HighRes-net | 37.45 | 0.92 | 46.64 | 0.980 |
| DBSR | 40.76 | 0.96 | 48.05 | 0.984 |
| LKR | 41.45 | 0.95 | — | — |
| MFIR | 41.56 | 0.96 | 48.33 | 0.985 |
| BIPNet | 41.93 | 0.96 | 48.49 | 0.985 |

Figure 16:
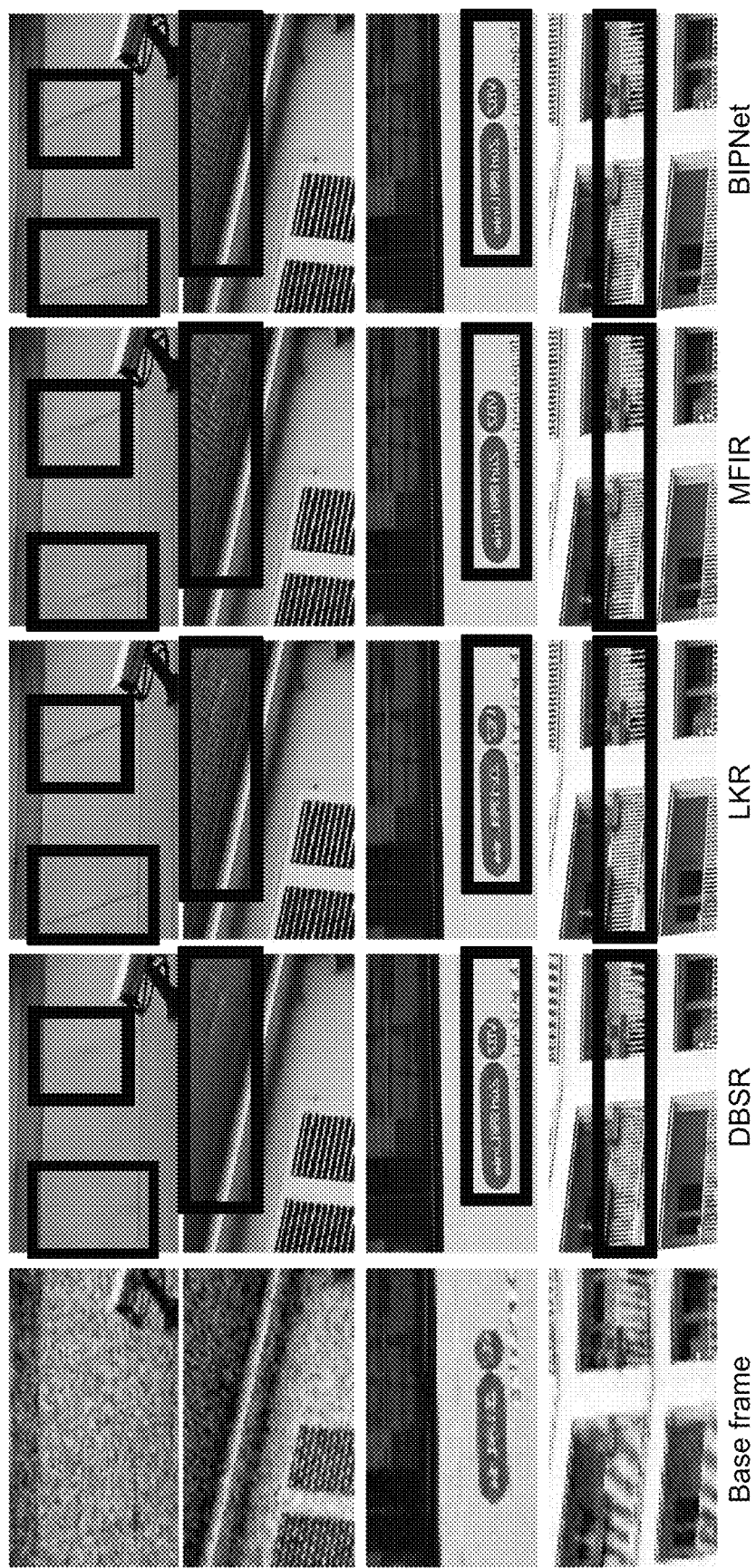
FIG. 16 are images illustrating comparison for ×4 burst SR on SyntheticBurst.

FIG. 16 illustrates comparisons for ×4 burst SR on SyntheticBurst. Visual results provided in FIG. 16 show that the SR images produced by the burst image processing network 600 are more sharper and faithful than those of the other algorithms. The burst image processing network 600 is capable of reconstructing structural content and fine textures, without introducing artifacts and color distortions. Whereas, the results of DBSR, LKR and MFIR contain splotchy textures and compromise image details.

To show the effectiveness of the burst image processing network 600 on large scale factor, experiments are performed for the 8 burst SR. LR-HR pairs are synthetically generated following the same procedure as described above for the SyntheticBurst dataset. FIGS. 17A, 17B, 17C illustrate results for ×8 burst SR on SyntheticBurst dataset. FIG. 17A is results for the base frame; FIG. 17B is results for the burst image processing network 500; FIG. 17C is results for the ground truth. Visual results in FIGS. 17A, 17B, 17C show that the burst image processing network 600 is capable of recovering rich details for such large scale factors as well, without any artifacts.

Figure 18:
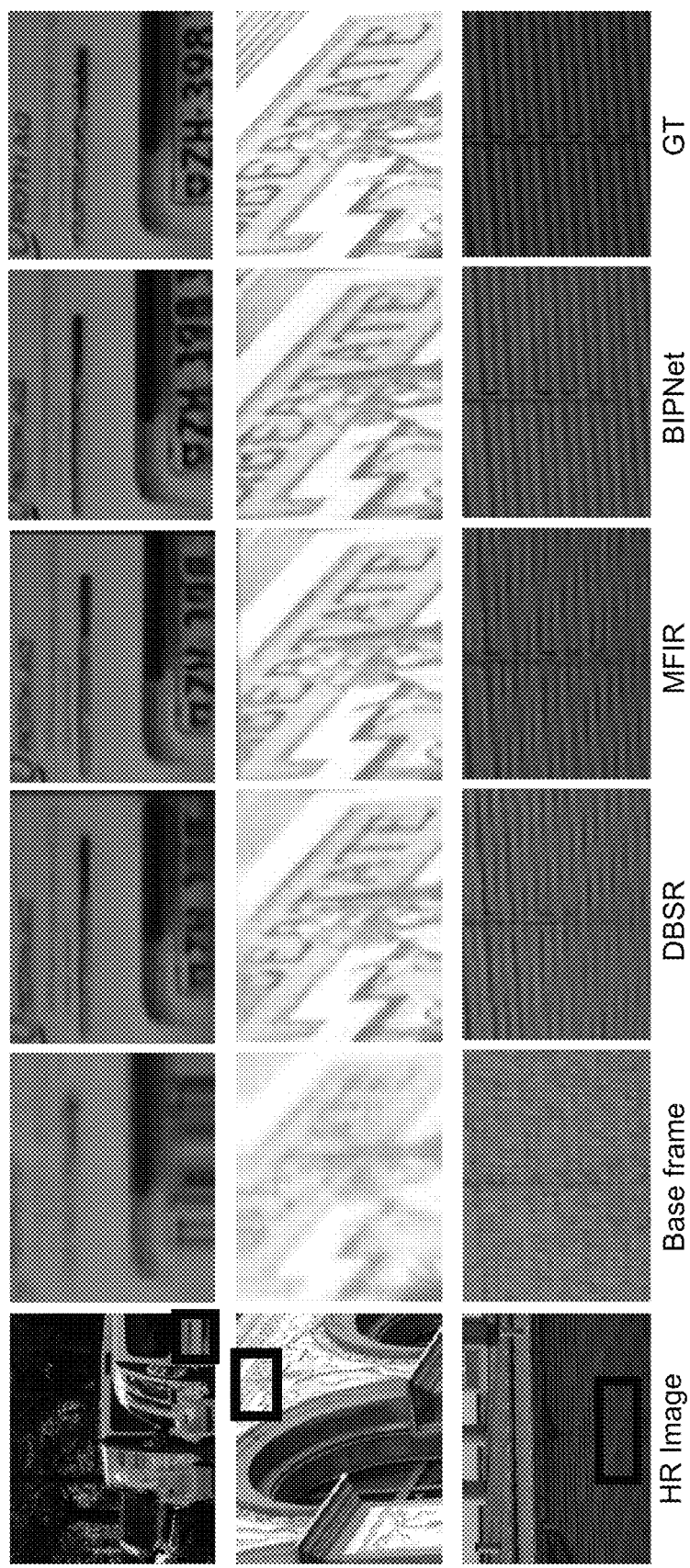
FIG. 18 are images illustrating comparison for ×4 burst super-resolution on Real BurstSR dataset.

SR results on real data. The LR input bursts and the corresponding HR ground-truth in BurstSR dataset suffer from minor misalignment as they are captured with different cameras. To mitigate this issue, Aligned L1 loss is used for training and aligned PSNR/SSIM for evaluating the model, as in previous works. See Bhat et al., *CVPR*, 2021 and Bhat at al., *ICCV*, 2021. It is noted that structural similarity index (SSIM index) is a perception-based model that considers image degradation as a perceived change in structural information, while also incorporating important perceptual phenomena. Structural information is the idea that the pixels have strong inter-dependencies especially when they are spatially close. These dependencies carry important information about the structure of the objects in the visual scene. The pre-trained burst image processing network 500 is fine-tuned for 15 epochs on training set while evaluated on validation set of BurstSR dataset. The image quality scores are reported in Table 1. Compared to the previous best approach MFIR, the burst image processing network 600 provides performance gain of 0.16 dB. See Bhat et al., *ICCV*, 2021. FIG. 18 illustrates comparisons for ×4 burst super-resolution on Real BurstSR dataset. The visual comparisons in FIG. 18 show that the burst image processing network 600 is more effective in recovering fine details in the reproduced images than other competing approaches.

Figure 19:
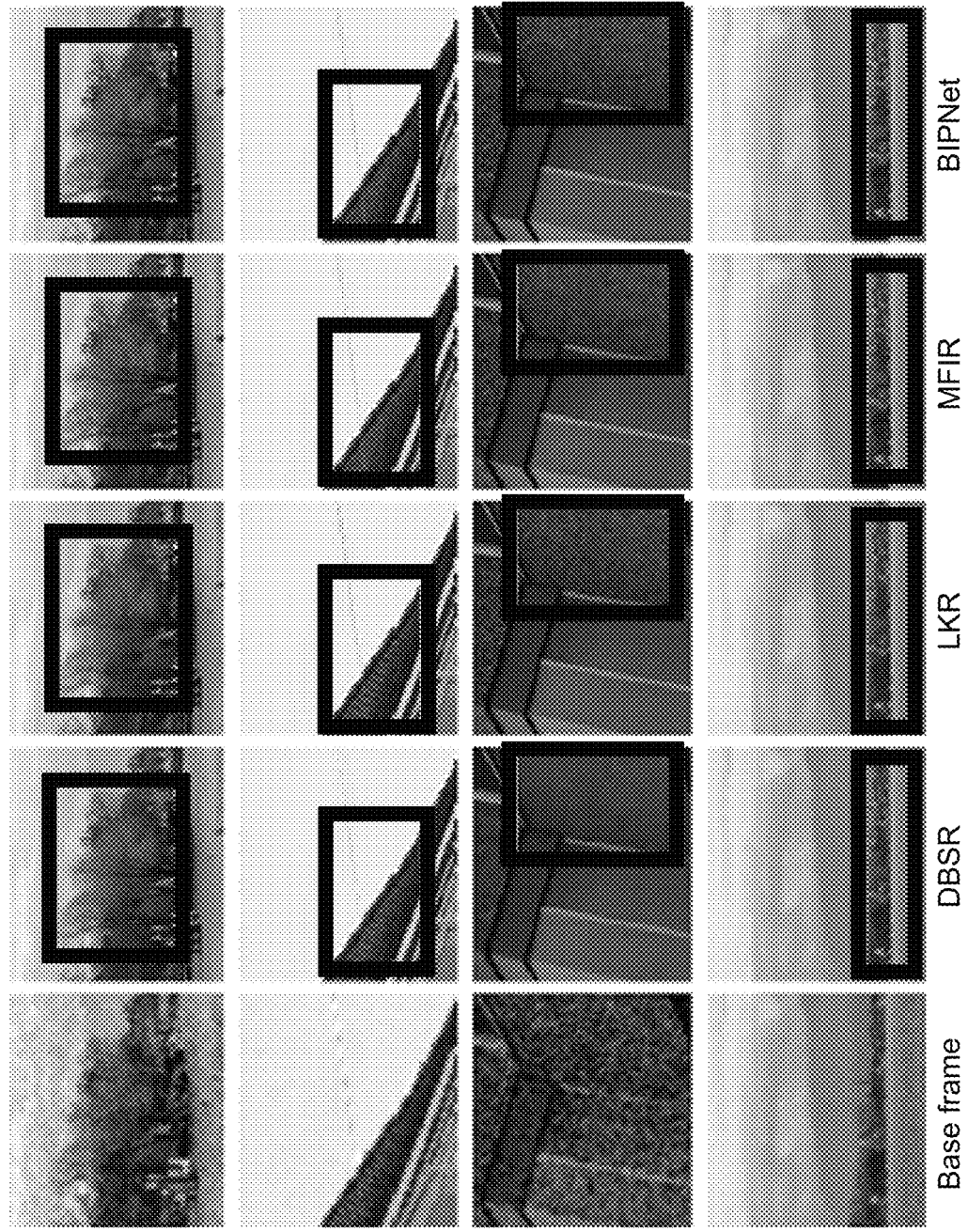
FIG. 19 are images illustrating comparison for ×4 burst super-resolution on SyntheticBurst dataset.
Figure 20:
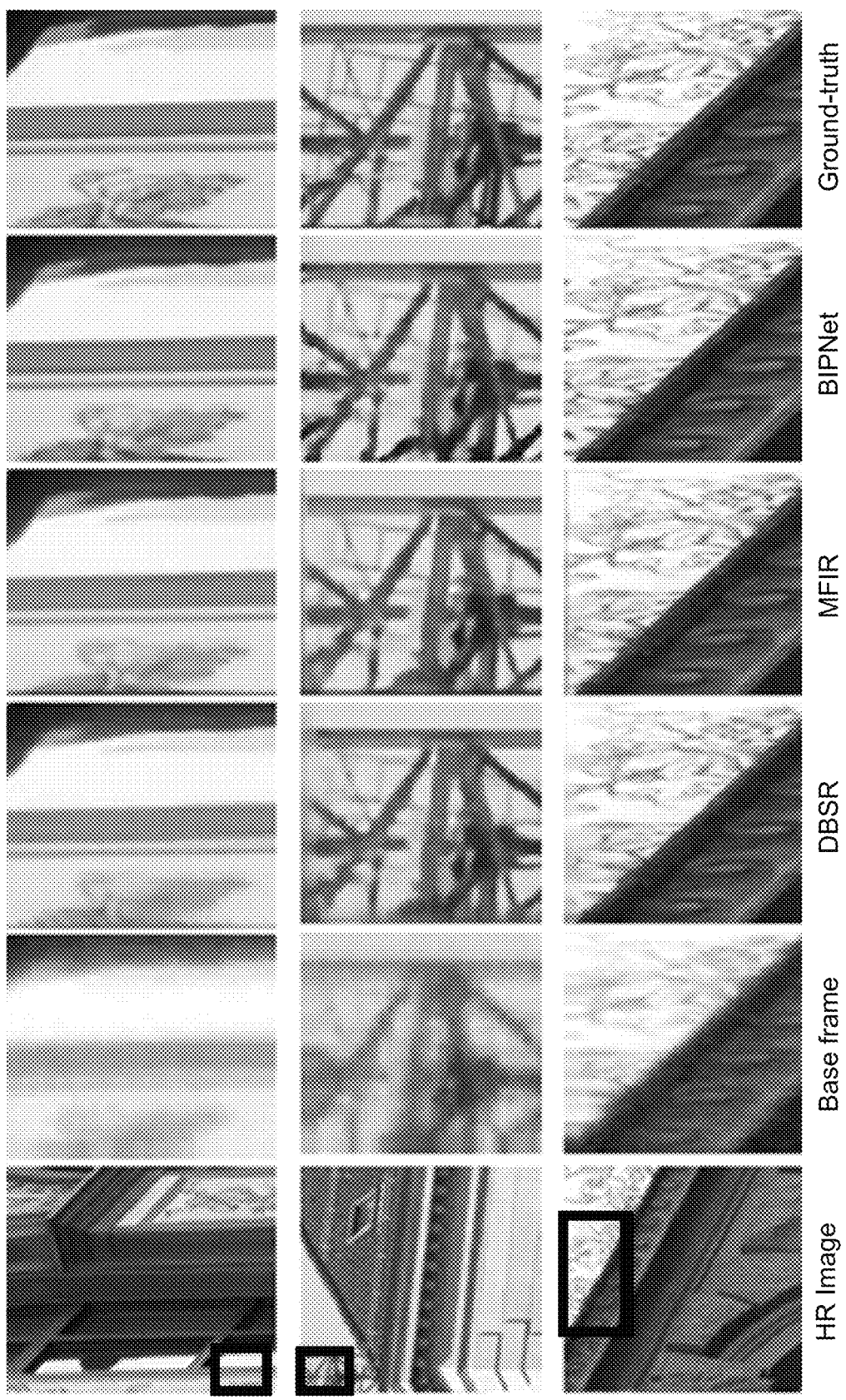
FIG. 20 are images illustrating comparison for ×4 burst SR on real BurstSR dataset.
Figure 21:
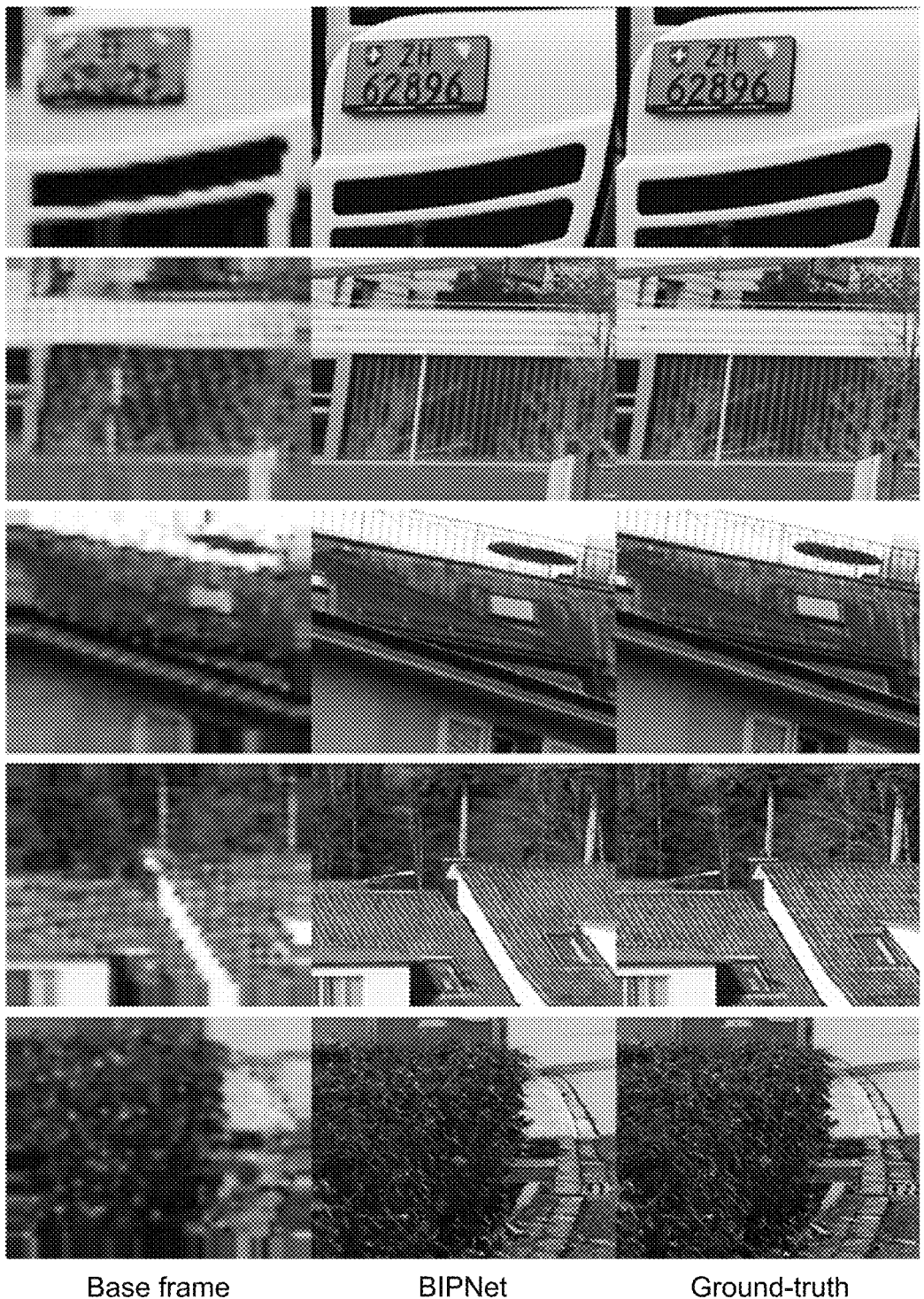
FIG. 21 are images illustrating results for ×8 SR on images from SyntheticBurst dataset.

FIG. 19 illustrates comparisons for ×4 burst super-resolution on SyntheticBurst dataset. FIG. 20 illustrates comparison for ×4 burst SR on real BurstSR dataset. The results provided in FIG. 19 and FIG. 20 show that the burst image processing network 600 performs favorably on both real and synthetic images for the scale factor ×4. The reproductions of the burst image processing network 600 are perceptually more faithful to the ground-truth than those of other methods. FIG. 21 illustrates results for ×8 SR on images from SyntheticBurst dataset. The true potential of the burst image processing network 600 is demonstrated in FIG. 21, where it successfully recovers the fine-grained details from extremely challenging LR burst images (that are downscaled by a factor of ×8).

Ablation Study. Ablation experiments demonstrate the impact of each individual component of the burst image processing network 600. All ablation models are trained for 100 epochs on SyntheticBurst dataset for SR scale factor 4. See Bhat et al., *ICCV*, 2021. Results are reported in Table 2. For the baseline model, Resblocks is deployed for feature extraction, simple concatenation operation for fusion, and transpose convolution for upsampling. See Bee Lim, Sanghyun Son, Heewon Kim, Seungjun Nah, and Kyoung Mu Lee. Enhanced deep residual networks for single image super-resolution. In *CVPRW*, 2017, incorporated herein by reference in its entirety. The baseline network achieves 36.38 dB PSNR. When the burst image processing network 600 modules are added to the baseline, the results improve significantly and consistently. For example, a performance boost of 1.85 dB is obtained when the deformable alignment module DAM is considered. Similarly, RAF contributes 0.71 dB improvement towards the model. With the PBFF mechanism 612, the network achieves significant gain of 1.25 dB. AGU 614 brings 1 dB increment in the upsampling stage. Finally, EBFA 800 demonstrates its effectiveness in correcting alignment errors by providing 0.3 dB improvement in PSNR. Overall, the burst image processing network 600 obtains a compelling gain of 5.17 dB over the baseline method.

TABLE 2

Importance of BIPNet modules evaluated on SyntheticBurst validation set for ×4 burst SR.

| Modules | A1 | A2 | A3 | A4 | A5 | A6 | A7 | A8 |
|---|---|---|---|---|---|---|---|---|
| Baseline | ✓ | ✓ | ✓ | ✓ | ✓ | ✓ | ✓ | ✓ |
| FPM(§3.1.1) |  | ✓ | ✓ | ✓ | ✓ | ✓ | ✓ | ✓ |
| DAM (§3.1.2) |  |  | ✓ | ✓ | ✓ | ✓ | ✓ | ✓ |
| RAF (§3.1.2) |  |  |  | ✓ | ✓ | ✓ | ✓ | ✓ |
| PBFF (§3.2) |  |  |  |  | ✓ | ✓ | ✓ | ✓ |
| MSF (§3.2) |  |  |  |  |  | ✓ | ✓ | ✓ |
| AGU (§3.3) |  |  |  |  |  |  | ✓ | ✓ |
| EBFA (§3.1) |  |  |  |  |  |  |  | ✓ |
| PSNR | 36.38 | 36.54 | 38.39 | 39.10 | 39.64 | 40.35 | 41.25 | 41.55 |

Finally, ablation experiments are performed to demonstrate the importance of the EBFA 800 and PBFF 612 modules by replacing them with existing alignment and fusion modules. Table 3(a) shows that replacing the EBFA 800 with other alignment modules have negative impact (PSNR drops at least over 1 dB). Similar trend can be observed when using fusion strategies other than the PBFF, see Table 3(b).

TABLE 3

Importance of the proposed alignment and fusion module evaluated on SyntheticBurstSR dataset for ×4 SR.

|  | Methods | PSNR↑ | SSIM↑ |
|---|---|---|---|
| (a) Alignment | Explicit | 39.26 | 0.944 |
|  | TDAN | 40.19 | 0.957 |
|  | EDVR | 40.46 | 0.958 |
| (b) Fusion | Addition | 39.18 | 0.943 |
|  | Concat | 40.13 | 0.956 |
|  | DBSR | 40.16 | 0.957 |
| (c) | BIPNet | 41.55 | 0.96 |

Burst Low-Light Image Enhancement

To further demonstrate the effectiveness of the burst image processing network 600, experiments are performed for burst low-light image enhancement. Given a low-light RAW burst, a goal is to generate a well-lit sRGB image. Since the input is mosaicked RAW burst, one level AGU is used to obtain the output.

Dataset. SID dataset consists of input RAW burst images captured with short-camera exposure in low-light conditions, and their corresponding ground-truth sRGB images. See Chen et al. The Sony subset contains 161, 20 and 50 distinct burst sequences for training, validation and testing, respectively. 28 k patches of spatial size 128×128 with burst size 8 are prepared from the training set of Sony subset of SID to train the network for 50 epochs.

Figure 22:
FIG. 22 are images illustrating burst low-light image enhancement on Sony subset.

Enhancement results. In Table 4, results of several low-light enhancement methods are reported. Learned Perceptual Image Patch Similarity (LPIPS) compares the perceptual similarity of frames based on high-order image structure. The burst image processing network 600 yields significant performance gain of 3.07 dB over the existing best method. See Ahmet Serdar Karadeniz, Erkut Erdem, and Aykut Erdem. Burst photography for learning to enhance extremely dark images. arXiv: 2006.09845, 2020, incorporated herein by reference in its entirety. FIG. 22 illustrates burst low-light image enhancement on Sony subset. The burst image processing network 600 better preserves color and structural details.

TABLE 4

Burst low-light image enhancement methods evaluated on the SID dataset. BIPNet is superior by 3.07 dB.

| Methods | PSNR↑ | SSIM↑ | LPIPS↑ |
|---|---|---|---|
| Chen et al. | 29.38 | 0.892 | 0.484 |
| Maharjan et al. | 29.57 | 0.891 | 0.484 |
| Zamir et al. | 29.13 | 0.881 | 0.462 |
| Zhao et al. | 29.49 | 0.895 | 0.455 |
| Karadeniz et al. | 29.80 | 0.891 | 0.306 |
| BIPNet | 32.87 | 0.936 | 0.305 |

Burst Denoising

Here, the effectiveness of the burst image processing network 600 is demonstrated on the burst denoising task. The burst image processing network 600 processes the input noisy sRGB burst and obtains a noise-free image. Since, there is no need to up-sample the extracted features, transpose convolution in the AGU is replaced by a simple group convolution while rest of the network architecture is kept unmodified.

Dataset. The approach in the burst image processing network 600 is demonstrated on the grayscale and color burst denoising datasets introduced in Mildenhall et al. and Xia et al. See Mildenhall et al. and Xia et al. These datasets contain 73 and 100 burst images respectively. In both datasets, a burst is generated synthetically by applying random translations to the base image. The shifted images are then corrupted by adding heteroscedastic Gaussian noise with variance $\sigma_r^2 + \sigma_s x$. See G. Healey and R. Kondepudy. Radiometric ccd camera calibration and noise estimation. *TPAMI*, 1994, incorporated herein by reference in its entirety. The networks are then evaluated on 4 different noise gains (1, 2, 4, 8), corresponding to noise parameters ($\log(\sigma_r)$, $\log(\sigma_s)$)→(-2.2, -2.6), (-1.8, -2.2), (-1.4, -1.8), and (-1.1, -1.5), respectively. Note that the noise parameters for the highest noise gain (Gain∝8) are unseen during training. Thus, performance on this noise level indicates the generalization of the network to unseen noise. Following Bhat et al., 20 k samples from the Open Images training set are utilized to generate the synthetic noisy bursts of burst-size 8 and spatial size 128×128. See Bhat at al., *ICCV*, 2021; and Ivan Krasin, Tom Duerig, Neil Alldrin, Vittorio Ferrari, Sami Abu-El-Haija, Alina Kuznetsova, Hassan Rom, Jasper Uijlings, Stefan Popov, Andreas Veit, Serge Belongie, Victor Gomes, Abhinav Gupta, Chen Sun, Gal Chechik, David Cai, Zheyun Feng, Dhyanesh Narayanan, and Kevin Murphy. Openimages: A public dataset for large-scale multi-label and multi-class image classification. Dataset available at https://github.com/openimages, 2017, each incorporated herein by reference in their entirety. The burst image processing network 600 is trained for 50 epochs both for the grayscale and color burst denoising tasks and evaluated on the benchmark datasets respectively. See Mildenhall et al.; Xia et al.

Figure 23:
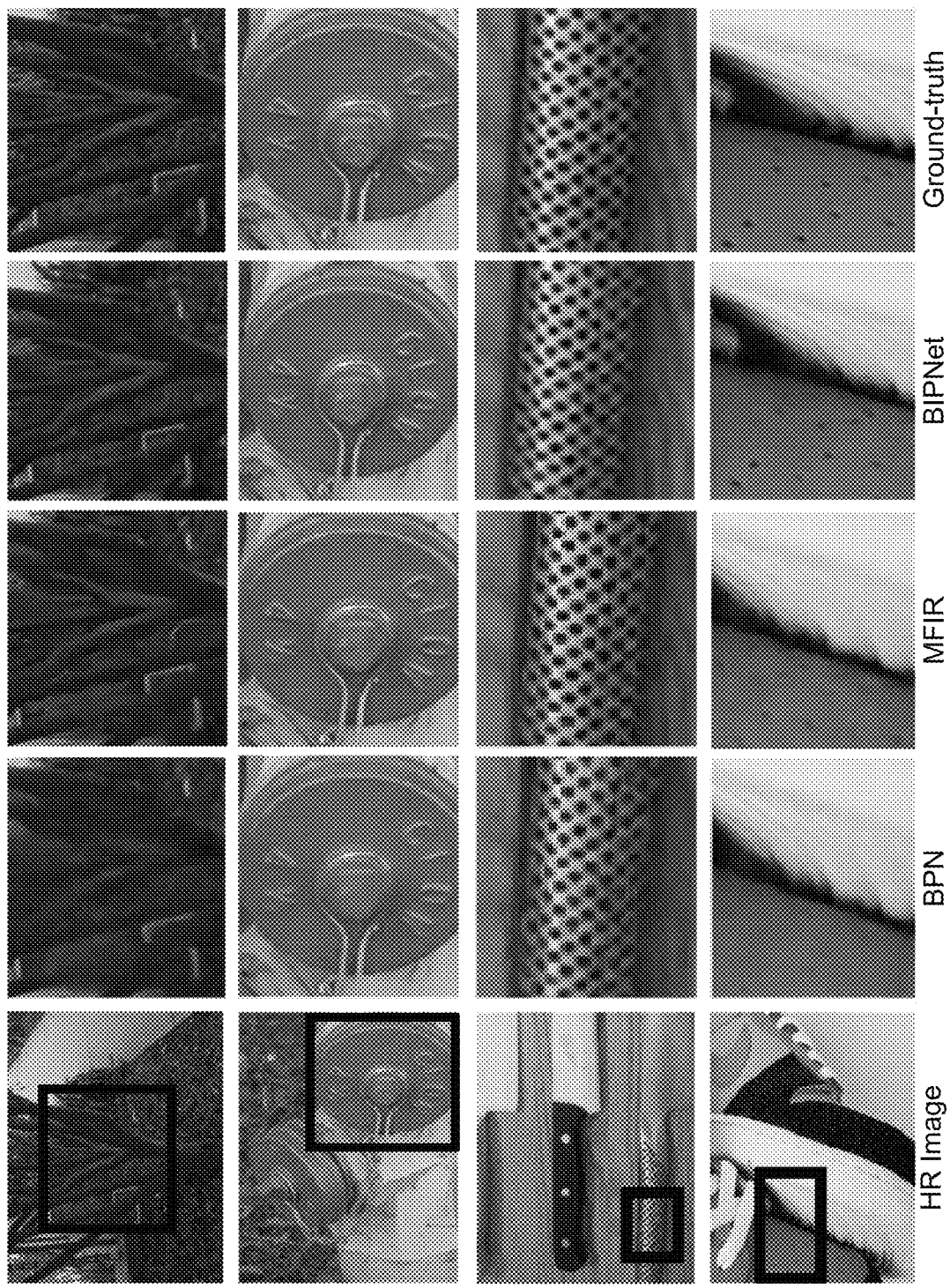
FIG. 23 are images illustrating comparison for burst denoising on gray-scale and color datasets.

Burst Denoising results. The burst image processing network 600 is compared with the several approaches (KPN, MKPN, BPN and MFIR) both for grayscale and color burst denoising tasks. See Mildenhall et al.; Marinc et al.; Xia et al.; and Bhat at al., *ICCV*, 2021. Table 5 shows that the burst image processing network 600 significantly advances state-of-the-art on grayscale burst denoising dataset. See Mildenhall et al. Specifically, the burst image processing network 600 outperforms the previous best method MFIR on all four noise levels. See Bhat at al., *ICCV*, 2021. On average, the burst image processing network 600 achieves 2:07 dB improvement over MFIR. See Bhat at al., *ICCV*, 2021. Similar performance trend can be observed in Table 6 for color denoising on color burst dataset. See Xia et al. Particularly, the burst image processing network 600 provides PSNR boost of 1:34 dB over previous best method MFIR. See Bhat at al., *ICCV*, 2021. FIG. 23 shows that the images reproduced by the burst image processing network 600 are cleaner and sharper than those of the other approaches. FIG. 23 illustrates comparisons for burst denoising on gray-scale and color datasets. See Mildenhall et al.; Xia et al. The burst image processing network 500 produces sharper and cleaner results than other competing approaches.

TABLE 5

Comparison of the method with prior approaches on the grayscale burst denoising set in terms of PSNR. See Mildenhall et al. The results for existing methods are from Bhat et al.

| | Gain ∝ 1 | Gain ∝ 2 | Gain ∝ 4 | Gain ∝ 8 | Average |
|---|---|---|---|---|---|
| HDR+ | 31.96 | 28.25 | 24.25 | 20.05 | 26.13 |
| BM3D | 33.89 | 31.17 | 28.53 | 25.92 | 29.88 |
| NLM | 33.23 | 30.46 | 27.43 | 23.86 | 28.75 |
| VBM4D | 34.60 | 31.89 | 29.20 | 26.52 | 30.55 |
| KPN | 36.47 | 33.93 | 31.19 | 27.97 | 32.39 |
| MKPN | 36.88 | 34.22 | 31.45 | 28.52 | 32.77 |
| BPN | 38.18 | 35.42 | 32.54 | 29.45 | 33.90 |
| MFIR | 39.37 | 36.51 | 33.38 | 26.69 | 34.74 |
| BIPNet | 41.26 | 38.74 | 35.91 | 31.35 | 36.81 |

TABLE 6

Comparison with conventional methods on the color burst denoising set in terms of PSNR. The results for existing methods are from Bhat et al. The disclosed approach outperforms BPN on all four noise levels with average margin of 1.34 dB.

| | Gain ∝ 1 | Gain ∝ 2 | Gain ∝ 4 | Gain ∝ 8 | Average |
|---|---|---|---|---|---|
| KPN | 38.86 | 35.97 | 32.79 | 30.01 | 34.41 |
| BPN | 40.16 | 37.08 | 33.81 | 31.19 | 35.56 |
| MFIR | 42.21 | 39.13 | 35.75 | 32.52 | 37.40 |
| BIPNet | 42.28 | 40.20 | 37.85 | 34.64 | 38.74 |

See Xia et al.

Figure 24:
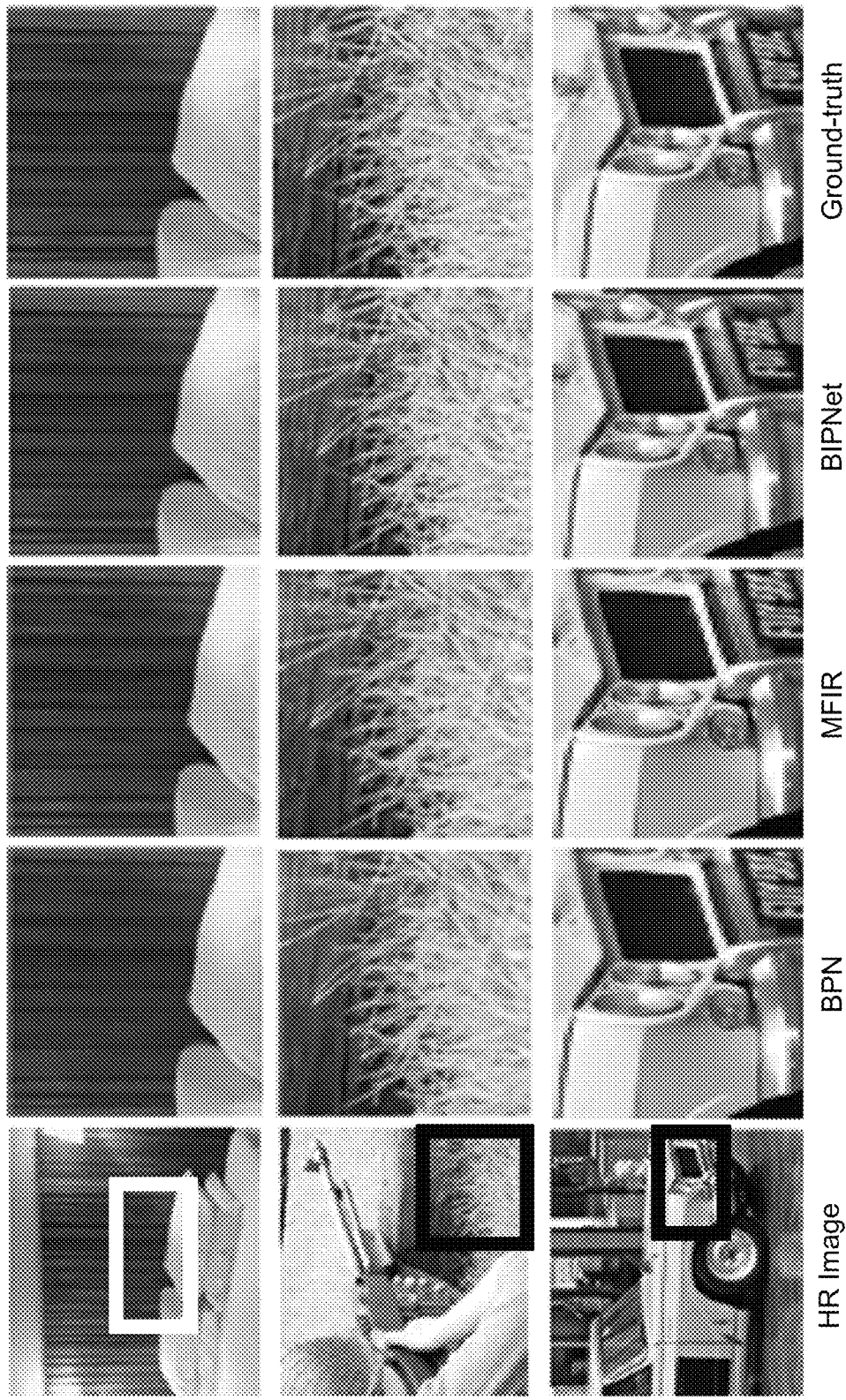
FIG. 24 are images illustrating comparisons for burst denoising on color datasets.
Figure 25:
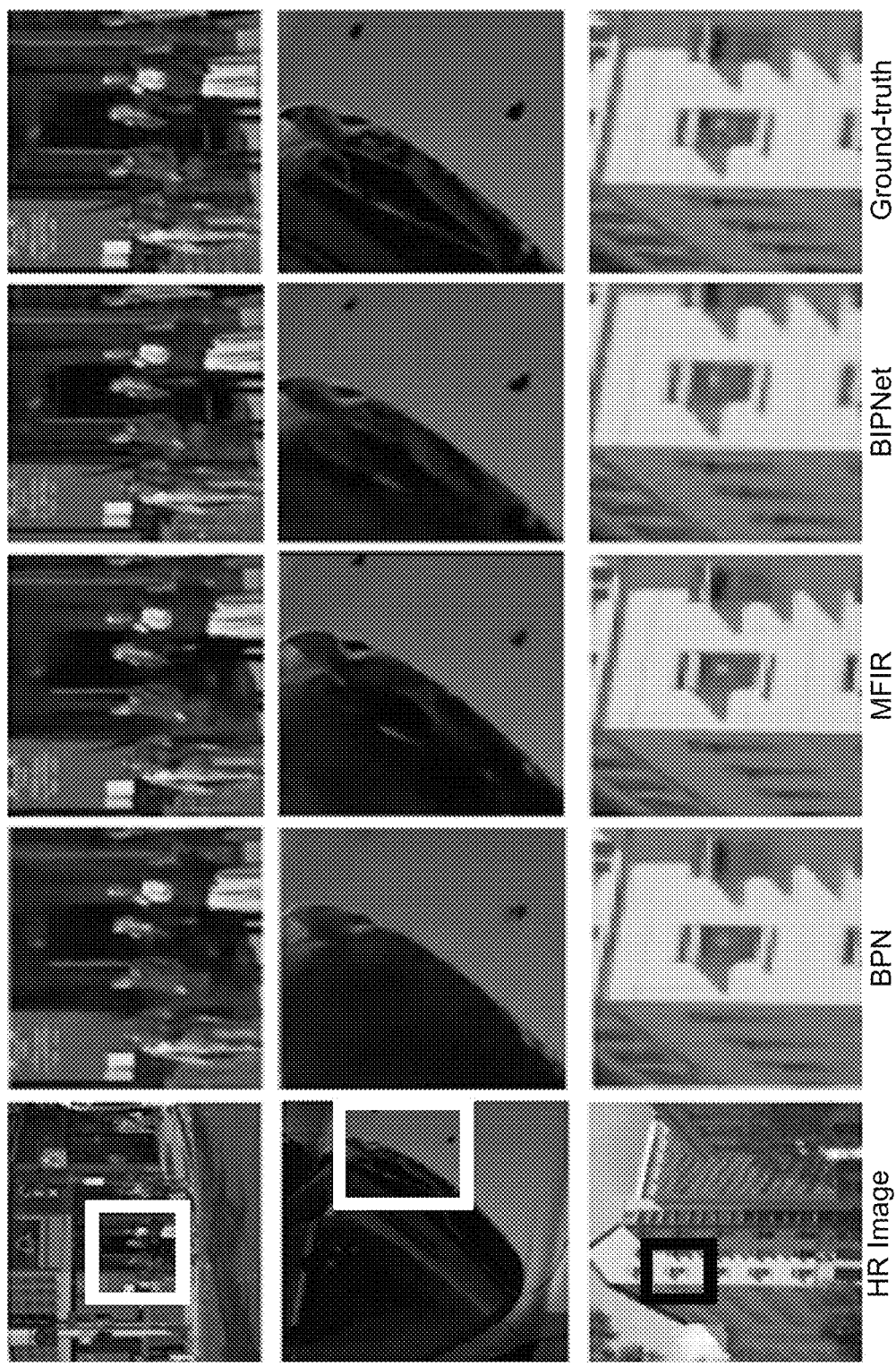
FIG. 25 are images illustrating comparisons for burst denoising on gray-scale.

FIG. 24 illustrates comparisons for burst denoising on color datasets. FIG. 25 illustrates comparisons for burst denoising on gray-scale. The results provided in FIG. 24 and FIG. 25 show that the burst image processing network 600 performs favorably on both grayscale and color noisy images. See Mildenhall et al.; Xia et al. Specifically, the burst image processing network 600 can recover fine details in the outputs and is closer to the ground-truth compared to existing state-of-the-art approaches. Regarding FIG. 24 the crops shown in boxes (in the input images shown in the left-most column) are magnified to illustrate the improvements in restoration results. The figure shows that the burst image processing network 600 produces sharper and clean results than other competing approaches.

Regarding FIG. 25 the crops shown in boxes (in the input images shown in the left-most column) are magnified to illustrate the improvements in restoration results. The figure shows that the burst image processing network 600 produces sharper and clean results than other competing approaches.

Numerous modifications and variations of the present invention are possible in light of the above teachings. It is therefore to be understood that within the scope of the appended claims, the invention may be practiced otherwise than as specifically described herein.

The invention claimed is:

1. A mobile device, comprising:
   at least one camera having an image capture circuit operating in a mode to capture a RAW image burst containing ten or more RGB images; and
   processing circuitry, including a neural network engine, to generate a single enhanced image from the RAW image burst, the neural network engine executing program instructions including
   an edge boosting feature alignment stage to remove inter-frame spatial and color misalignment from the RAW image burst to obtain a plurality of aligned burst frames;
   a pseudo-burst feature fusion stage to create a set of pseudo-burst features that combine complementary information from the aligned burst frames; and
   an adaptive group upsampling stage to progressively increase spatial resolution while merging the set of pseudo-burst features and output the single enhanced image.

2. The mobile device of claim 1, wherein the edge boosting feature alignment stage performs feature processing to reduce noise in initial burst features followed by alignment of all images in the RAW image burst with a base frame, wherein the base frame is one of the images in the RAW image burst.

3. The mobile device of claim 2, wherein the feature processing includes at least one residual global context attention block for obtaining global features of the RAW image burst among feature channels.

4. The mobile device of claim 1, wherein the edge boosting feature alignment stage further performs alignment correction by computing a high-frequency residue after determining a difference between refined aligned features and base frame features.

5. The mobile device of claim 1, wherein the pseudo-burst feature fusion stage includes generation of feature tensors obtained by concatenating corresponding channel-wise features extracted from all aligned burst frames.

6. The mobile device of claim 2, wherein the pseudo-burst feature fusion stage includes a light-weight U-Net to extract multi-scale features, in which the light-weight U-net uses the feature processing of the edge boosting feature alignment stage.

7. The mobile device of claim 1, wherein the adaptive group upsampling stage takes as input the set of pseudo-burst features produced by the pseudo-burst feature fusion stage and outputs a super-resolved output via three-level progressive upsampling.

8. The mobile device of claim 1, wherein the camera is a smartphone camera, and the neural network engine generates a single super-resolution image from a lower resolution RAW image burst.

9. The mobile device of claim 1, wherein the camera is a smartphone camera, and the neural network engine generates a well-light RGB image from low-light RAW image burst.

10. The mobile device of claim 1, wherein the at least one camera is a smartphone camera,
    wherein the adaptive group upsampling stage includes a group convolution layer, and
    wherein the neural network engine generates a noise-free image from a noisy RGB image burst.

11. A non-transitory computer readable storage medium storing a mobile application having program instructions, which when executed in a neural network engine, performs a method comprising:
    removing inter-frame spatial and color misalignment from a RAW image burst to obtain a plurality of aligned burst frames;
    creating a set of pseudo-burst features that combine complementary information from the aligned burst frames; and
    progressively increasing spatial resolution while merging the set of pseudo-burst features and outputting a single enhanced image.

12. The non-transitory computer readable storage medium of claim 11, further comprising:
    performing feature processing to reduce noise in initial burst features followed by performing alignment of all images in the RAW image burst with a base frame, wherein the base frame is one of the images in the RAW image burst.

13. The non-transitory computer readable storage medium of claim 12, further comprising:
    obtaining global features of the RAW image burst among feature channels.

14. The non-transitory computer readable storage medium of claim 11, wherein the removing to obtain aligned burst frames further comprises:
    performing alignment correction by computing a high-frequency residue after determining a difference between refined aligned features and base frame features.

15. The non-transitory computer readable storage medium of claim 11, further comprising:
    generating feature tensors obtained by concatenating corresponding channel-wise features extracted from all aligned burst frames.

16. The non-transitory computer readable storage medium of claim 12, further comprising:
    a light-weight U-Net to extract multi-scale features, in which the light-weight U-net uses the feature processing.

17. The non-transitory computer readable storage medium of claim 11, further comprising:
    receiving the set of pseudo-burst features and outputting a super-resolved output via three-level progressive upsampling.

18. The non-transitory computer readable storage medium of claim 11, wherein the neural network engine generates a single super-resolution image from a lower resolution RAW image burst.

19. The non-transitory computer readable storage medium of claim 11, wherein the neural network engine generates a well-light RGB image from low-light RAW image burst.

20. The non-transitory computer readable storage medium of claim 11, wherein the neural network engine generates a noise-free image from a noisy RGB image burst.

* * * * *